(12) United States Patent
Horie et al.

(10) Patent No.: US 8,103,112 B2
(45) Date of Patent: Jan. 24, 2012

(54) DECODING METHOD, DECODING APPARATUS, STORAGE MEDIUM IN WHICH DECODING PROGRAM IS STORED, AND ELECTRONIC CAMERA

(75) Inventors: Kenichi Horie, Machida (JP); Seiichiro Sakata, Akiruno (JP)

(73) Assignee: Olympus Imaging Corp., Tokyo (JP)

( * ) Notice: Subject to any disclaimer, the term of this patent is extended or adjusted under 35 U.S.C. 154(b) by 1022 days.

(21) Appl. No.: 12/027,858

(22) Filed: Feb. 7, 2008

(65) Prior Publication Data

US 2008/0193026 A1 Aug. 14, 2008

(30) Foreign Application Priority Data

Feb. 9, 2007 (JP) ................................. 2007-030484

(51) Int. Cl.
*G06K 9/36* (2006.01)
(52) U.S. Cl. .......................... 382/232; 382/154; 348/345
(58) Field of Classification Search .................. 382/154, 382/232, 233, 238; 708/203; 348/345, 284.1; 375/122; 345/555
See application file for complete search history.

(56) References Cited

U.S. PATENT DOCUMENTS 4,591,919 A * 5/1986 Kaneda et al. ................ 348/348
5,076,687 A 12/1991 Adelson
6,097,394 A 8/2000 Levoy et al.
7,837,330 B2 * 11/2010 Montgomery et al. ........... 353/7
2007/0285550 A1 * 12/2007 Son ............................... 348/335

OTHER PUBLICATIONS

T. Takano, et al., "3-D Space Coding Based on Light Ray Data," *Scholarly Journal of Image Information Media Association*, vol. 52, No. 1, pp. 1321-1327, 1998 (Japan).
Ren Ng, "Fourier Slice Photography," (presented at *AMC SIGGRAPH 2005*, pp. 735-744 (Jul. 31, 2005-Aug. 4, 2005)).
Ren Ng, et al., "Light Field Photography with a Hand-held Plenoptic Camera," *Stanford Tech Report CTSR* Feb. 2005.

* cited by examiner

*Primary Examiner* — Samir Ahmed
*Assistant Examiner* — Ali Bayat
(74) *Attorney, Agent, or Firm* — John C. Pokotylo; Straub & Pokotylo

(57) ABSTRACT

In a decoding method for decoding coded light ray information, coded first image information and coded second image information different from the first image information are decoded. The first image information and the second image information are obtained in taking a subject. The light ray information is generated based on the decoded first and second image information. Image information corresponding to a first focus value is generated and stored in a storage medium, based on the generated light ray information. An image is displayed based on the image information corresponding to the first focus value. Image information corresponding to a second focus value different from the first focus value is generated and stored in the storage medium, based on the generated light ray information. The image information corresponding to the second focus value is generated and stored, while the image is displayed or before the image is displayed.

20 Claims, 22 Drawing Sheets

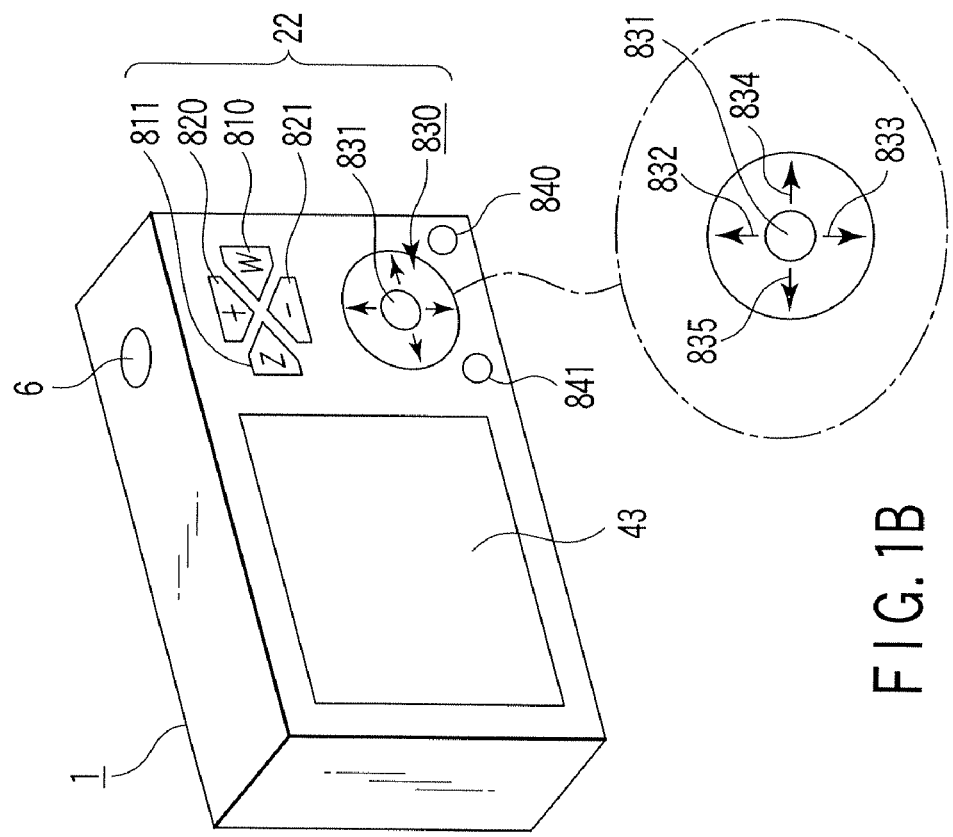
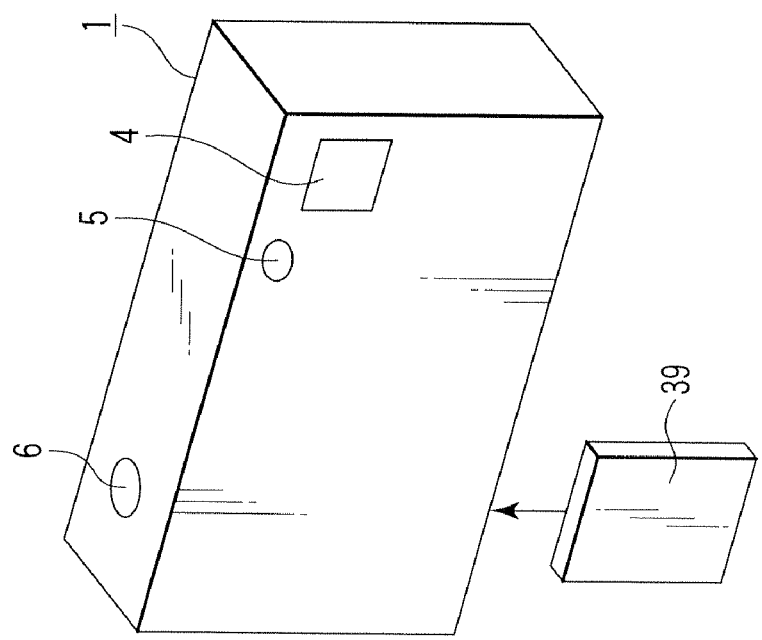
FIG. 1B
FIG. 1A

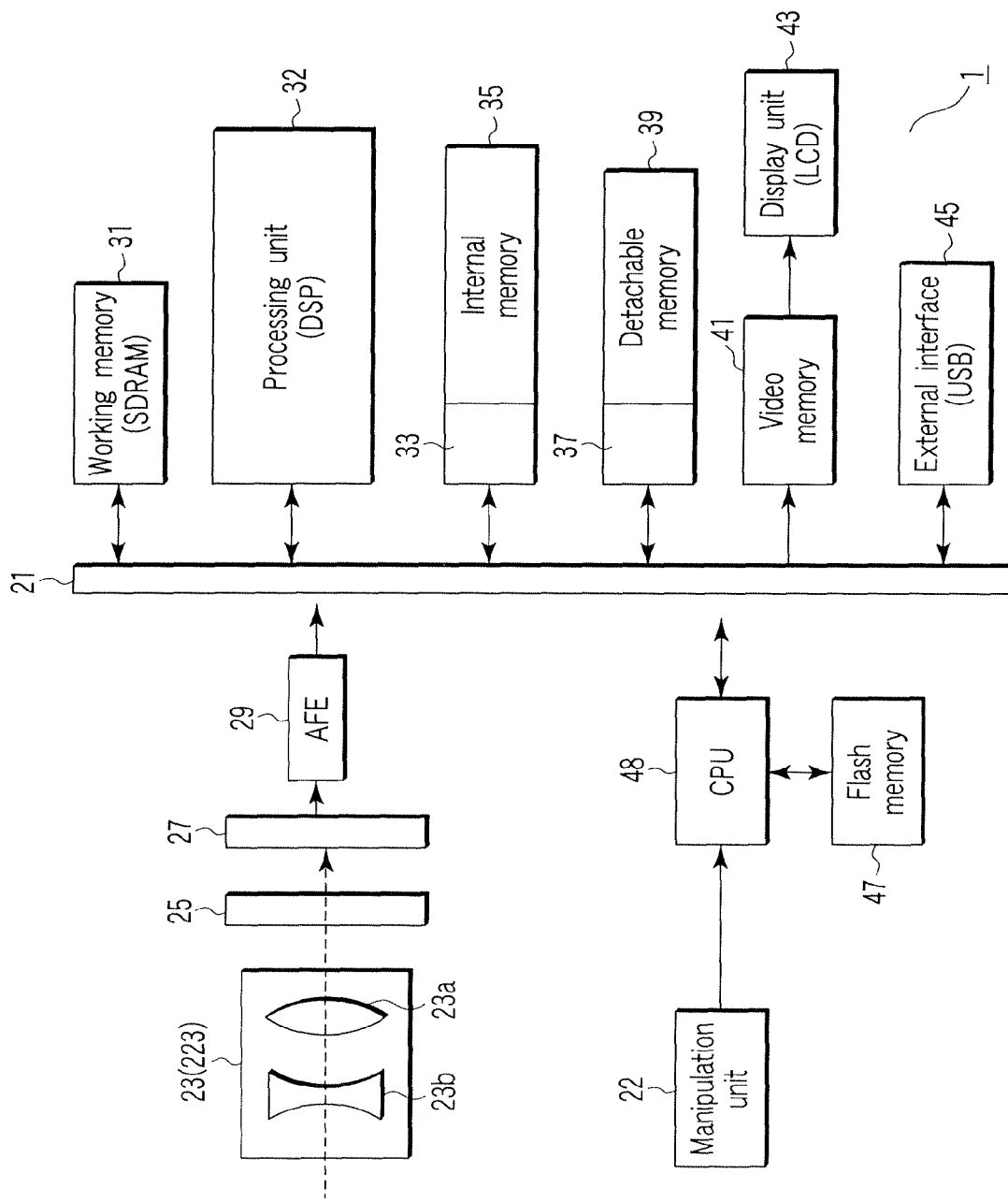
F I G. 2

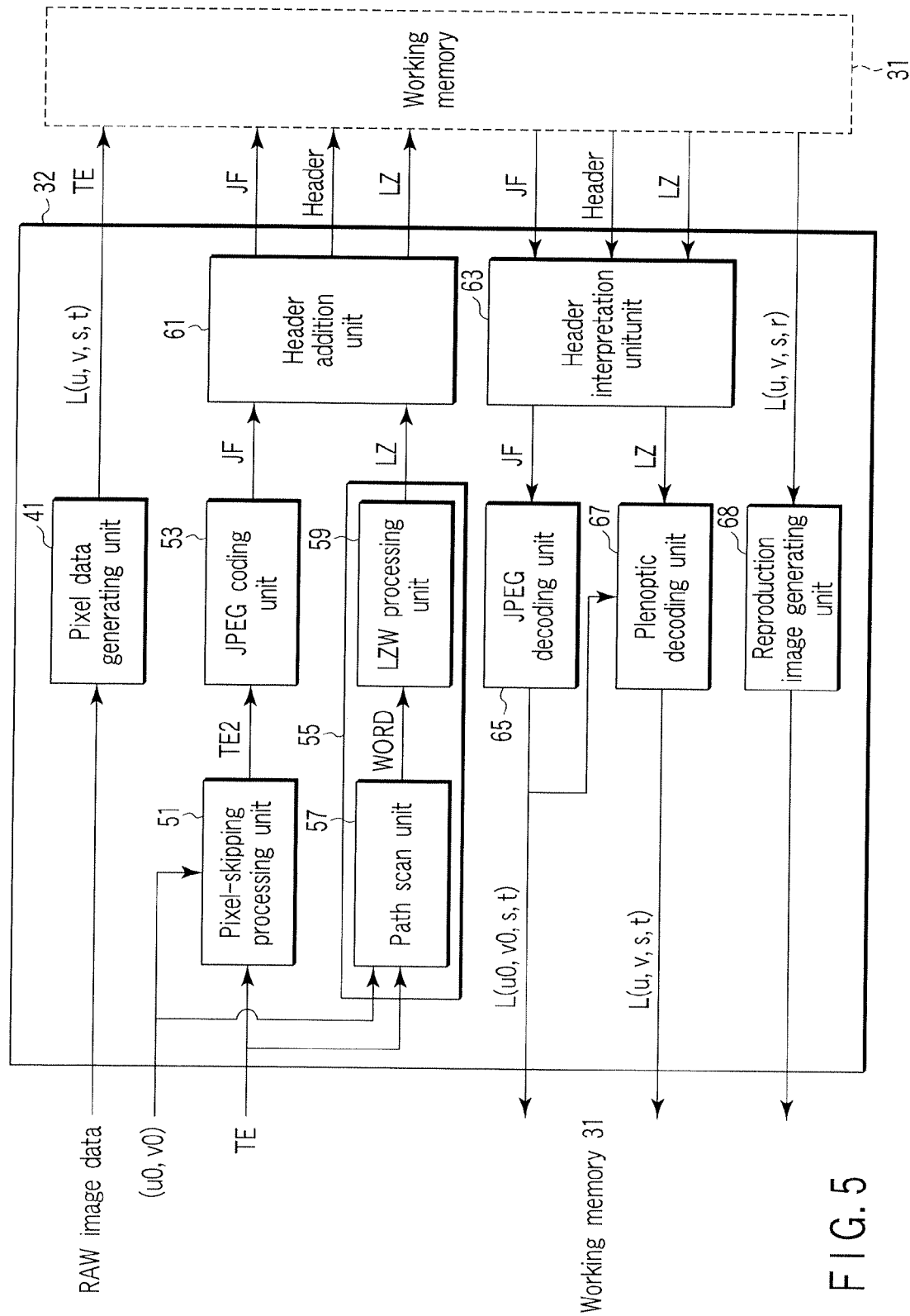
F I G. 5

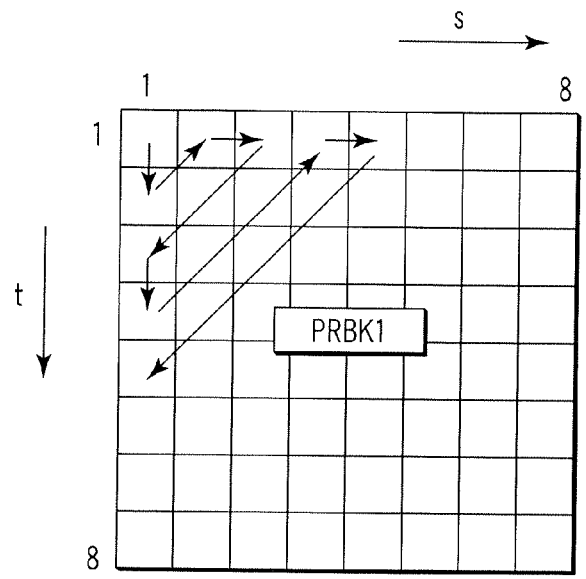
F I G. 10
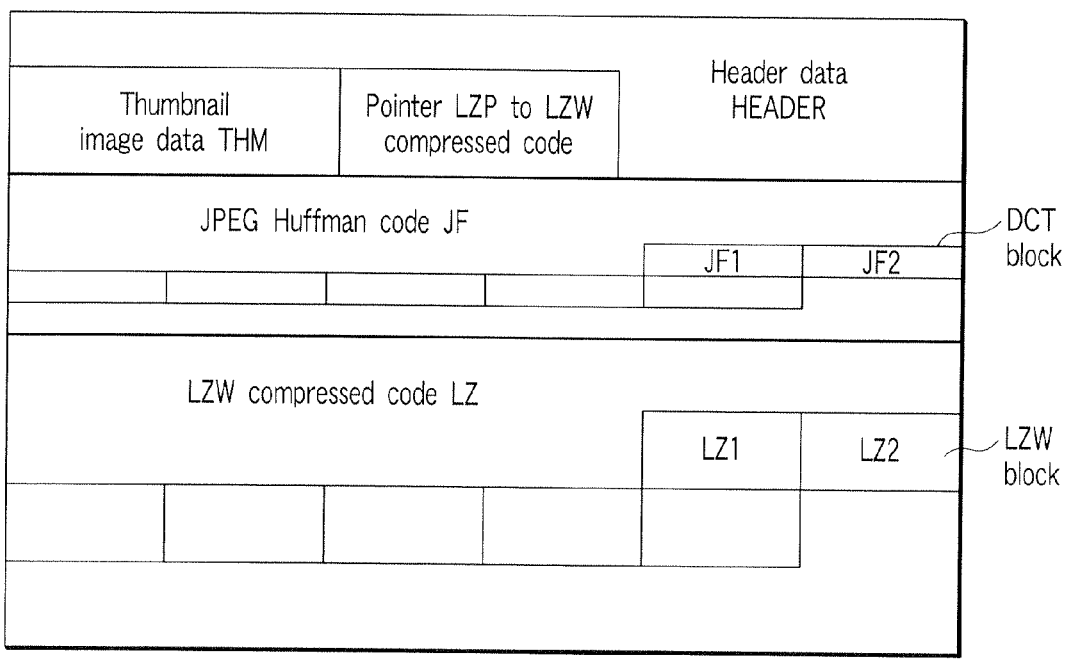
F I G. 11

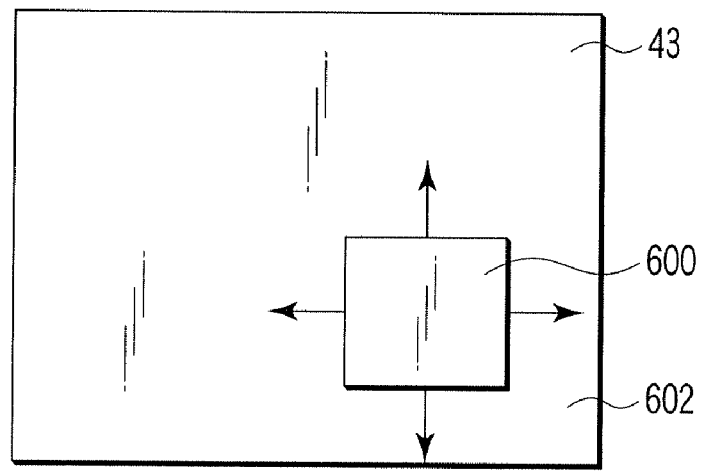
F I G. 19
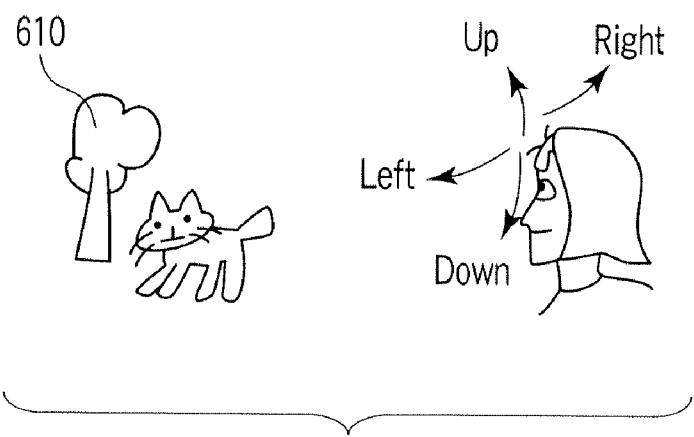
F I G. 20

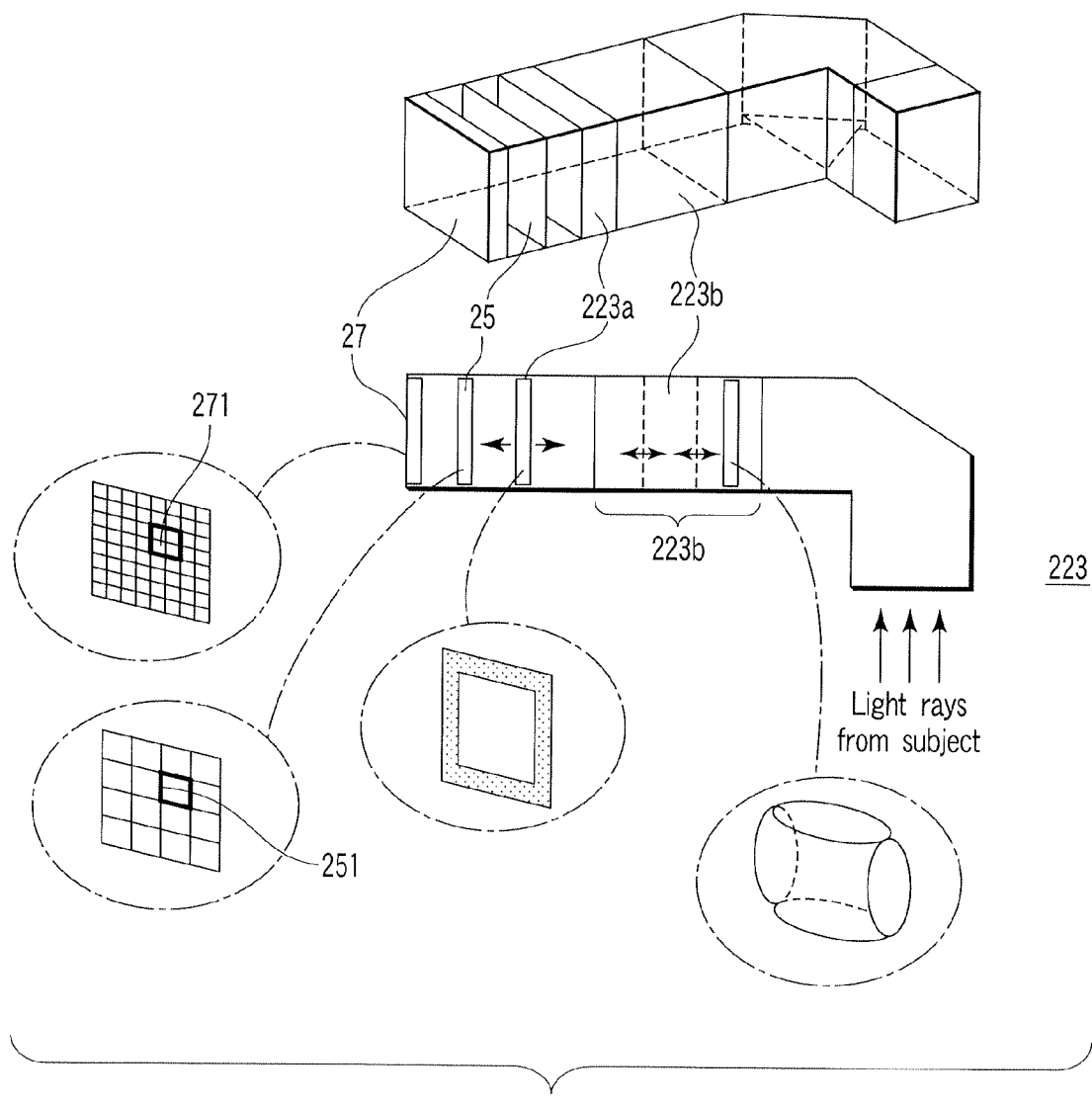
F I G. 22

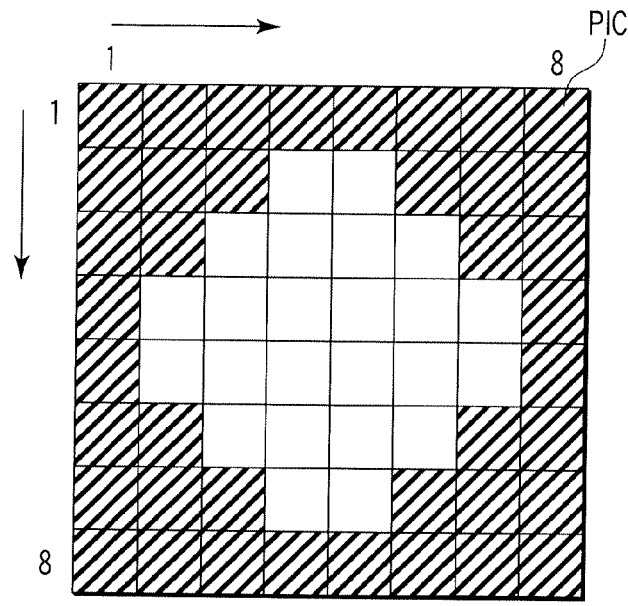
Effective number of pixels in the case of circular optical system: 24
F I G. 23
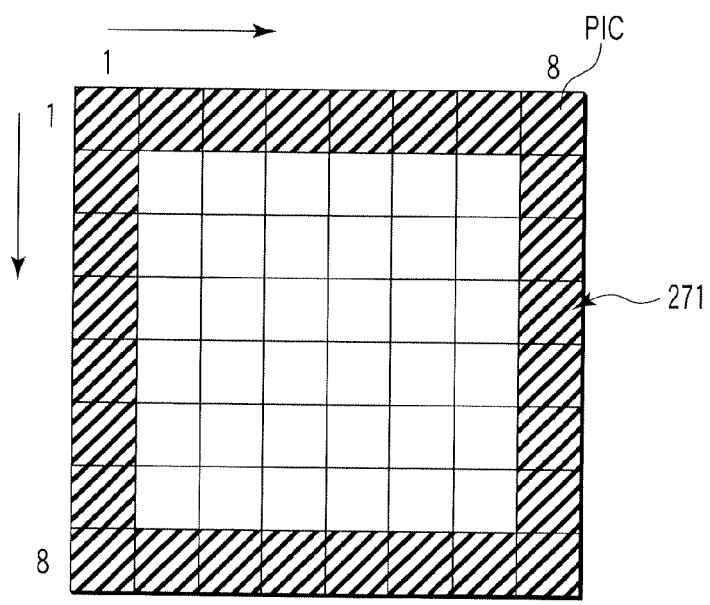
Effective number of pixels in the case of rectangular optical system: 36
F I G. 24

DECODING METHOD, DECODING APPARATUS, STORAGE MEDIUM IN WHICH DECODING PROGRAM IS STORED, AND ELECTRONIC CAMERA

CROSS-REFERENCE TO RELATED APPLICATIONS

This application is based upon and claims the benefit of priority from prior Japanese Patent Application No. 2007-030484, filed Feb. 9, 2007, the entire contents of which are incorporated herein by reference.

BACKGROUND OF THE INVENTION

1. Field of the Invention

The present invention relates to a decoding method and a decoding apparatus for decoding an image taken and coded by a plenoptic camera, a storage medium in which a decoding program is stored, and an electronic camera having a characteristic of a shape of an optical system.

2. Description of the Related Art

FIG. 25 shows a focus function of a normal camera. Light collected by a focus lens 121 and other optical systems (not shown) such as a zoom optical system is projected onto an imaging device 127 disposed in an image plane 121F. As shown by an arrow 121B, a position of the focus lens 121 can be changed along an optical axis 121H with respect to the image plane 121F. The position of the focus lens 121 is used in processing firmware of the camera during control of auto focus (AF) and managed by a discrete numeric value. The numeral 121A of FIG. 25 designates the discrete "focus value".

In the case where the optical system of the normal camera includes a zoom optical system, or in the case where the normal camera has the complicated optical system, the focus lens 121 is formed by a lens group including plural lenses. In such cases, the focus value 121A indicates a changeable and controllable overall state of the lens group.

The camera lens is based on the fact that an image of an object on a plane is formed on a plane. The plane on which the image is formed on the image plane 121F without defocus by the focus lens 121 disposed with a predetermined focus value is referred to as "best object plane". When a subject is located on a best object plane 121D, the image is formed on the imaging device 127 while the camera is completely brought in focus. A subject distance 121E which is a distance from the image plane 121F to the best object plane 121D can be changed by changing the focus value 121A. The focus value 121A and the subject distance 121E correspond to each other one-on-one.

Actually a depth of field 121G exists according to an allowable range of the defocus, and the light is projected onto the imaging device 127 while the camera is substantially brought in focus even if an object plane 121J deviates from the best object plane by the depth of field 121G.

FIG. 26A shows the case in which an image is taken with the normal camera. A user manipulates the auto focus or manual focus to bring the camera into focus on a subject X. The manipulation corresponds to a situation in which the best object plane 121D is matched with a subject plane of the subject X by moving the focus lens 121 in the optical axis direction 121H. FIG. 26A shows a state in which the focus lens 121 is moved to a certain focus value 121A to match the best object plane 121D with the subject surface of the subject X. When a release button is pressed in this state of things, the light from the subject X is projected onto the imaging device 127 through the focus lens 121 while the camera is brought in focus.

On the other hand, in the plenoptic camera, the light from the subject X is projected onto a microlens array 125 as shown in FIG. 26B. That is, the microlens array 125 is placed in the image plane 121F of FIG. 26B, and the imaging device 127 is disposed at the back of the microlens array 125. Through the structure of the plenoptic camera, various light rays K1, K2, and K3 projected from the subject X onto the microlens array 125 are separated by an individual microlens 125A and projected onto a part 127A of the imaging device 127. Accordingly, information on the image formed by the part 127A of the imaging device includes information on a direction of the light ray. On the other hand, because the light from the subject X is projected onto the microlens array 125, the imaging result of the imaging device 127 includes positional information indicating from which position of the subject X the light ray is incident.

Thus, the image information (light field image) which is the imaging result of the imaging device in the plenoptic camera includes the information (light ray information) on the light ray in the space. The plenoptic camera can sample four-dimensional light ray information as described above.

For example, U.S. Pat. No. 6,097,394 discloses a technique of coding the light ray information (light field image information). In the technique, a vector quantization method is adopted to improve a decoding rate. Vector coding data is decoded by referring to and outputting an index in a code book (dictionary data) unlike predictive coding adopted in Moving Picture Experts Group (MPEG) in which an access to decoded data becomes complicated.

BRIEF SUMMARY OF THE INVENTION

According to a first aspect of the invention, there is provided a decoding method for decoding coded light ray information including positional information on a predetermined surface and angular information on the light ray incident to the surface, when a light ray from a subject is incident to the surface, the method comprising: decoding coded first image information and coded second image information different from the first image information, the first image information and the second image information being obtained in taking the subject and associated with the subject; generating the light ray information based on the decoded first image information and second image information; generating image information based on the generated light ray information, the image information corresponding to a first focus value in taking the subject; storing the image information corresponding to the first focus value in a storage medium; displaying an image based on the image information corresponding to the first focus value; generating image information based on the generated light ray information, the image information corresponding to a second focus value different from the first focus value; and storing the image information corresponding to the second focus value in the storage medium, wherein the image information corresponding to the second focus value is generated and stored, while the image is displayed or before the image is displayed.

According to a second aspect of the invention, there is provided a decoding apparatus which decodes coded light ray information including positional information on a predetermined surface and angular information on the light ray incident to the surface, when a light ray from a subject is incident to the surface, the apparatus comprising: a decoding unit which decodes coded first image information and coded second image information to generate the light ray information, the second image information being different from the first image information, the first image information and the second image information being obtained in taking the subject and associated with the subject; a first image generating unit which generates image information based on the generated light ray information, the image information corresponding to a first focus value in taking the subject, the first image generating unit storing the image information in a storage medium; a display unit which displays an image according to the image information generated by the first image generating unit; and a second image generating unit which generates image information based on the light ray information generated by the decoding unit, the image information corresponding to a second focus value different from the first focus value, the second image generating unit storing the image information in the storage medium.

According to a third aspect of the invention, there is provided a computer-readable recording medium having stored therein a program for decoding coded light ray information including positional information on a predetermined surface is incident to the surface and angular information on the light ray incident to the surface, when a light ray from a subject, wherein the program causes the computer to execute the functions of: decoding coded first image information and coded second image information to generate the light ray information, the second image information being different from the first image information, the first image information and the second image information being obtained in taking the subject and associated with the subject; generating image information based on the generated light ray information, the image information corresponding to a first focus value in taking the subject; storing the image information corresponding to the first focus value in a storage medium; displaying an image according to the stored image information; generating image information based on the generated light ray information, the image information corresponding to a second focus value different from the first focus value; and storing the image information corresponding to the second focus value in the storage medium.

According to a fourth aspect of the invention, there is provided an electronic camera comprising: a focus lens; a microlens array which is formed by a plurality of microlenses arranged at a focal position of the focus lens; an imaging device which is formed by a plurality of pixels two-dimensionally arranged, the plurality of pixels converting a subject image into an electric signal, the subject image being formed by sequentially passing through the focus lens and the plurality of microlenses; and a coding unit which codes light ray information according to light reception result of the plurality of pixels, wherein a two-dimensional shape of a surface perpendicular to an optical axis of the focus lens is substantially identical to a two-dimensional shape of each microlens constituting the microlens array.

According to a fifth aspect of the invention, there is provided a decoding method for decoding image data according to coded light ray information including positional information on a predetermined surface and angular information on the light ray incident to the surface, when a light ray from a subject is incident to the surface, the method comprising: decoding first image information to generate first pixel data corresponding to each of a plurality of pieces of two-dimensional block data, the first image information being obtained in taking the subject, the coded light ray information including the first image information, the image data including the pieces of two-dimensional block data; decoding second image information to generate second pixel data for each of the plurality of pieces of two-dimensional block data based on the first pixel data of the two-dimensional block data, the coded light ray information including the second image information; generating image data corresponding to a first focus value in taking a subject based on the first pixel data and the second pixel data; storing the image data corresponding to the first focus value in a storage medium; displaying the image data corresponding to the first focus value; generating image data corresponding to a second focus value based on the first pixel data and the second pixel data, the second focus value being different from the first focus value; and storing the image data corresponding to the second focus value in the storage medium.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 1A and 1B show appearances of a digital camera according to a first embodiment of the invention;

FIG. 2 shows an entire configuration of the digital camera according to the first embodiment of the invention;

FIG. 5 is a functional block diagram for explaining a part of functions of a processing unit shown in FIG. 2;

FIG. 10 shows zigzag scan adopted in the coding method of the first embodiment;

FIG. 11 shows a format for recording coded image data in the first embodiment;

FIG. 19 shows a zoom-in image;

FIG. 20 is a diagram for explaining the case in which images of a subject are generated from image information taken by a plenoptic camera when the subject is viewed from various depiction angles;

FIG. 22 shows a structure of an optical system of a digital camera according to a second embodiment of the invention;

FIG. 23 shows effective pixels in the case where a circular optical system and an 8-by-8 pixel imaging unit are used;

FIG. 24 shows effective pixels in the case where a rectangular optical system and an 8-by-8 pixel imaging unit are used;

DETAILED DESCRIPTION OF THE INVENTION

Figure 3:
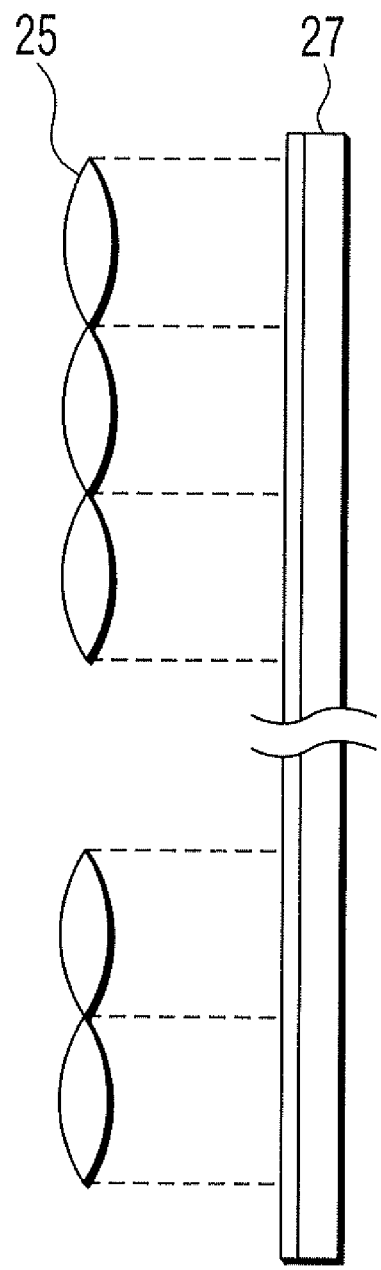
FIG. 3 shows a relationship between a microlens array and pixels of an imaging unit shown in FIG. 2.

Digital cameras according to embodiments of the invention will be described below.

First Embodiment

FIGS. 1A and 1B show appearances of a digital camera 1 according to a first embodiment of the invention. Referring to FIG. 1A, a light incident port 4 to which light is incident from a subject and a flashlight lamp 5 are disposed in a front face of the digital camera 1. A detachable memory 39 is detachably formed in the digital camera 1. A release switch 6 for shooting of a still image is disposed in a top face of the digital camera 1.

Referring to FIG. 1B, a display unit 43 such as a liquid crystal display and a manipulation unit 22 are disposed in a rear face of the digital camera 1.

FIG. 2 shows an internal configuration of the digital camera 1 of the first embodiment. Referring to FIG. 2, the digital camera 1 includes the manipulation unit 22, an optical system 23, a microlens array 25, an imaging unit 27, an analog front end (AFE) 29, a working memory 31, a processing unit 32, a memory interface (I/F) 33, an internal memory 35, a memory I/F 37, the detachable memory 39, a video memory 41, the display unit 43, an external I/F 45, a flash memory 47, and a CPU 48.

The AFE 29, the working memory 31, the processing unit 32, the memory I/F 33, the memory I/F 37, the video memory 41, the external I/F 45, and the CPU 48 are electrically connected to one another through a signal line 21.

Referring to FIG. 1B, the manipulation unit 22 includes a zoom-in button 810, a zoom-out button 811, a focus value forward button 820, and a focus value backward button 821. The zoom-in button 810, the zoom-out button 811, the focus value forward button 820, and the focus value backward button 821 are arranged in a cross shape. The focus value forward button 820 is arranged on an upper side of the rear face of the digital camera 1. The focus value backward button 821 is arranged on a lower side of the rear face of the digital camera 1. The zoom-in button 810 is arranged on a right side of the rear face of the digital camera 1. The zoom-out button 811 is arranged on a left side of the rear face of the digital camera 1.

The button arrangement of FIG. 1A is shown by way of example only, and the arrangement can appropriately be changed.

In the manipulation unit 22, for example, a cross manipulation unit 830 is disposed below the buttons 810, 811, 820, and 821 in the rear face of the digital camera 1. In the cross manipulation unit 830, an upward arrow button 832, a downward arrow button 833, a rightward arrow button 834, and a leftward arrow button 835 are disposed around an OK button 831 located in the center. In the upward arrow button 832, the downward arrow button 833, the rightward arrow button 834, and the leftward arrow button 835, the case where the OK button 831 is pressed differs from the case where the OK button 831 is not pressed in a mode.

Figure 25:
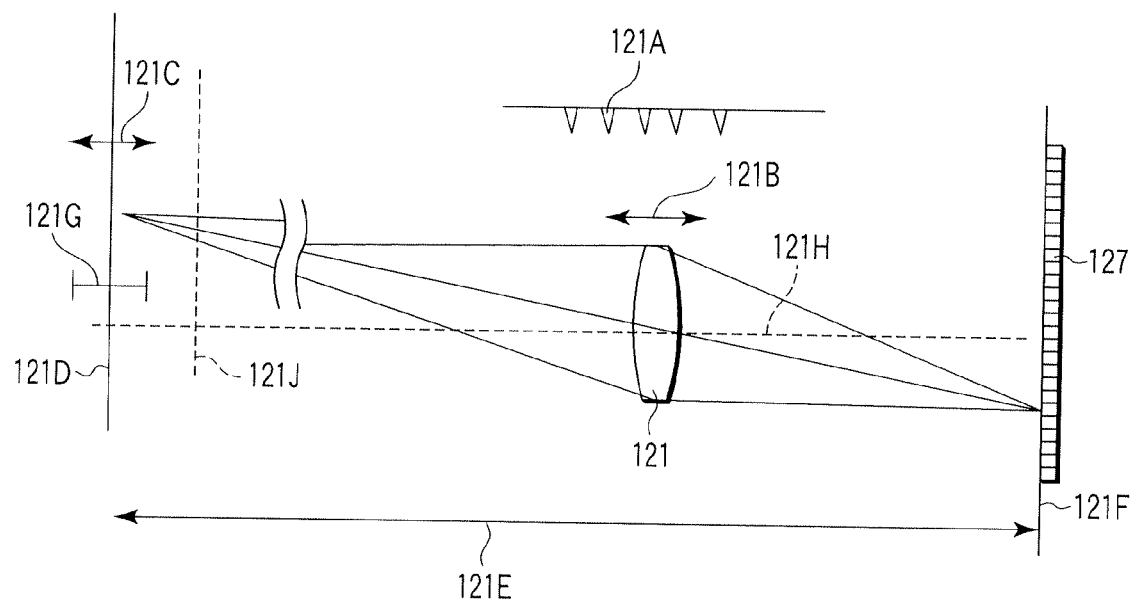
FIG. 25 shows a principle of a general camera.

In the case where the OK button 831 is pressed, the upward arrow button 832, the downward arrow button 833, the rightward arrow button 834, and the leftward arrow button 835 are used to specify a depict angle of a reproduction image. For example, the depiction angle of the reproduction image can be specified horizontally and vertically in the range of 0 to ±10°. The digital camera 1 is the plenoptic camera described with reference to FIG. 25B, and the digital camera 1 produces the reproduction images of the plural depiction angles based on the light ray information.

In the case where the OK button 831 is not pressed, the upward arrow button 832, the downward arrow button 833, the rightward arrow button 834, and the leftward arrow button 835 are used to move horizontally and vertically a window in which a zoom image is displayed in the reproduction image.

The manipulation unit 22 also includes an image recording button 840 and a cancel button 841. The image recording button 840 is used to record an image corresponding to a certain focus value or an image of a certain depiction angle, which are produced based on the light ray information. The cancel button 841 is used to cancel any manipulation or cancel a mode being used.

The optical system 23 includes a focus lens 23a and a zoom lens 23b. The optical system 23 collects the light from the subject and outputs the light toward the microlens array 25.

The focus lens 23a projects the light from each point of the subject onto one convergent point on the microlens array 25. In a shooting mode, the zoom lens 23b is moved toward a zoom-in direction (wide angle side) when the zoom-in button 810 is pressed, and the zoom lens 23b is moved toward a zoom-out direction (telephoto side) when the zoom-out button 811 is pressed.

In the first embodiment, the focus lens 23a and the zoom lens 23b have circular two-dimensional shapes for example.

Figure 4:
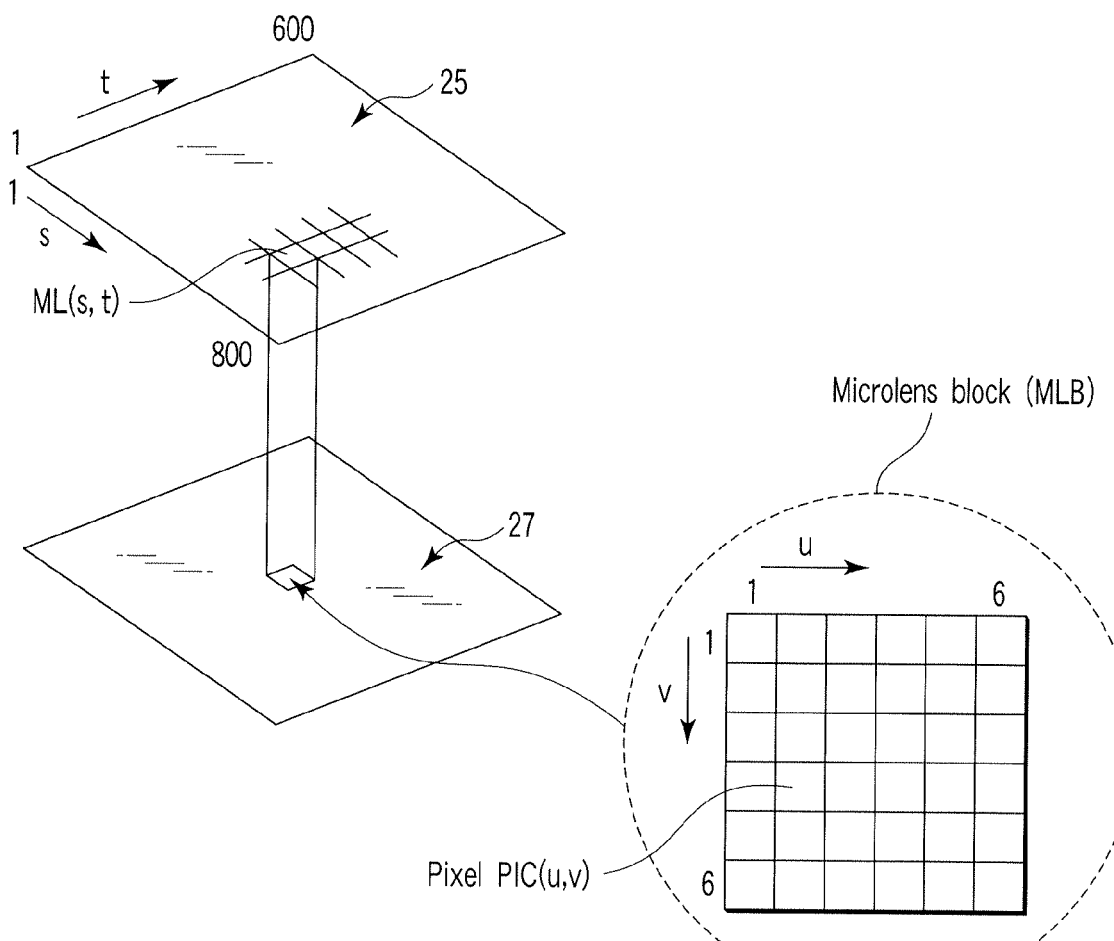
FIG. 4 shows a microlens block.

As shown in FIGS. 3 and 4, the microlens array 25 is formed by a plural microlenses ML(s,t) arrayed in a s-by-t matrix shape. Each microlens constituting the microlens array 25 separates the light (convergent light) incident to the microlens from each point of the subject according to an outgoing direction (angle) from the point, and the microlens project the light to a pixel on the imaging plane of the imaging unit 27.

The imaging unit 27 is formed by a CCD or a CMOS sensor, and is located on an opposite side to the optical system 23 in relation to the microlens array 25. The imaging unit 27 may be formed by a single plate type or a three-plate type. In the imaging unit 27, plural pixels are arrayed in a matrix shape. In the first embodiment, the pixels constituting the imaging unit 27 are dealt with in a unit of a 6-by-6 pixel microlens block MLB. The microlens block MLB(s,t) corresponds to one microlens ML(s,t). It is not always necessary that the microlens block MLB(s,t) correspond to one microlens ML(s,t) one-on-one. The microlens block MLB(s,t) may be produced by pixel interpolation processing.

As shown in FIG. 4, a 6-by-6 pixel PIC(u,v) is allocated to each microlens block MLB(s,t). The imaging unit 27 generates charge by performing photoelectric conversion of the light received by each pixel, and generates an analog RAW image signal according to the charge.

As described below, in the first embodiment, the processing unit 32 performs interpolation processing based on digital RAW image data obtained from the RAW image signal, and generates pixel data L(u,v,s,t) of the pixel PIC(u,v) of each microlens block MLB(s,t).

In the first embodiment, the pixel data L(u,v,s,t) of the 6-by-6 pixel of each microlens block MLB(s,t) has the light ray information.

The light ray information in a broad sense shall mean information on a light ray. Generally, in order to obtain the information on the light ray, it is necessary to obtain one point (x,y,z) through which the light ray passes in a free space and an angle (θ,φ) when the light ray passes through the point. However, in the free space considered in the shooting by the digital camera 1, because radiance is not changed in any point on the light ray, general light ray information can be regarded as four-dimensional light ray information. That is, in this case, the light ray information shall mean information including the position of the point at which the light ray intersects a predetermined two-dimensional manifold and the angle at which the light ray is incident to the manifold. At this point, the predetermined manifold is a virtual object and has any shape. For example, the predetermined manifold has a flat plane or a spherical plane. The manifold is not always formed by a single plane, but the manifold may be formed by two different planes. The light ray information is not the four-dimensional light ray information, but may be three-dimensional light ray information depending on application of the light ray information. The position (two dimension) of the point at which the light ray intersects a predetermined plane and only the angle (one dimension) formed by the light ray and a vector in one direction on the plane in the angle (two dimension) of the light ray incident to the plane are considered in the three-dimensional light ray information.

Alternatively, the light ray information may be described as information on two places on a line in which a first plane and a second plane intersect each other. For example, U.S. Pat. No. 6,097,394 discloses the description method.

In the digital camera 1 of the first embodiment, the plane of the microlens array 25 can be formed in a predetermined plane. At this point, it is assumed that the position on the plane is described by a coordinate (s,t) and the angle incident to the plane is described by a coordinate (u,v).

The AFE 29 performs predetermined analog front end processing to an analog image signal input from the imaging unit 27. The AFE 29 performs A/D conversion of an image signal obtained by the analog front end processing, and writes the digital RAW image data obtained by the A/D conversion in the working memory 31.

The processing target data of the processing unit 32 or the post-processing data is temporarily stored in the working memory 31. For example, the working memory 31 is formed by a Synchronous DRAM (SDRAM).

The processing unit 32 performs coding and decoding of the image data taken by the digital camera 1, as described later. For example, the processing unit 32 is formed by a Digital Signal Processor (DSP). The processing of the processing unit 32 will be described in detail later.

The internal memory 35 is formed by a semiconductor memory such as a flash memory, and is rigidly incorporated in the digital camera 1. The image data taken by the digital camera 1 is stored in the internal memory 35, and the image data stored in the internal memory 35 is input from and output to the signal line 21 through the memory interface 33.

For example, the detachable memory 39 is formed by a memory card including a flash memory, and is detachably attached to the digital camera 1. The image data taken by the digital camera 1 is stored in the detachable memory 39, and the image data stored in the detachable memory 39 is input from and output to the signal line 21 through the memory interface 37.

Image data for display generated by the processing unit 32 is temporarily stored in the video memory 41. The display unit 43 displays the image according to the image data stored in the video memory 41. For example, the display unit 43 is formed by a liquid crystal display.

The data stored is input from and output to an external device of the digital camera 1 through the external interface 45. For example, the external interface 45 is formed by a Universal Serial Bus (USB) interface.

Various programs for executing imaging operations and parameters for performing various pieces of processing are stored in the flash memory 47.

The CPU 48 executes the program read from the flash memory 47 and controls the whole operation of the digital camera 1.

The processing unit 32 of FIG. 2 will be described below. FIG. 5 is a functional block diagram for explaining a part of functions of the processing unit 32 of FIG. 2.

Referring to FIG. 5, the processing unit 32 includes functional blocks of a pixel data generating unit 50, a pixel-skipping processing unit 51, a Joint Photographic Experts Group (JPEG) coding unit 53, a plenoptic coding unit 55, a header addition unit 61, a header interpretation unit 63, a JPEG decoding unit 65, a plenoptic decoding unit 67, and a reproduction image generating unit 68.

A part of the pixel data generating unit 50, the pixel-skipping processing unit 51, the JPEG coding unit 53, the plenoptic coding unit 55, the header addition unit 61, the header interpretation unit 63, the JPEG decoding unit 65, the plenoptic decoding unit 67, and the reproduction image generating unit 68 may be formed not by DSP but by a dedicated hardware circuit. A part of or all the functions may be realized by a processor except for DSP.

The processing of the processing unit 32 mainly includes processing for generating the pixel data L(u,v,s,t), processing for coding the pixel data L(u,v,s,t), processing for decoding the coded pixel data L(u,v,s,t), processing for displaying the image according to the decoded pixel data, and processing for producing and displaying the image according to the specified focus value.

Each processing will sequentially be described.

Figure 6:
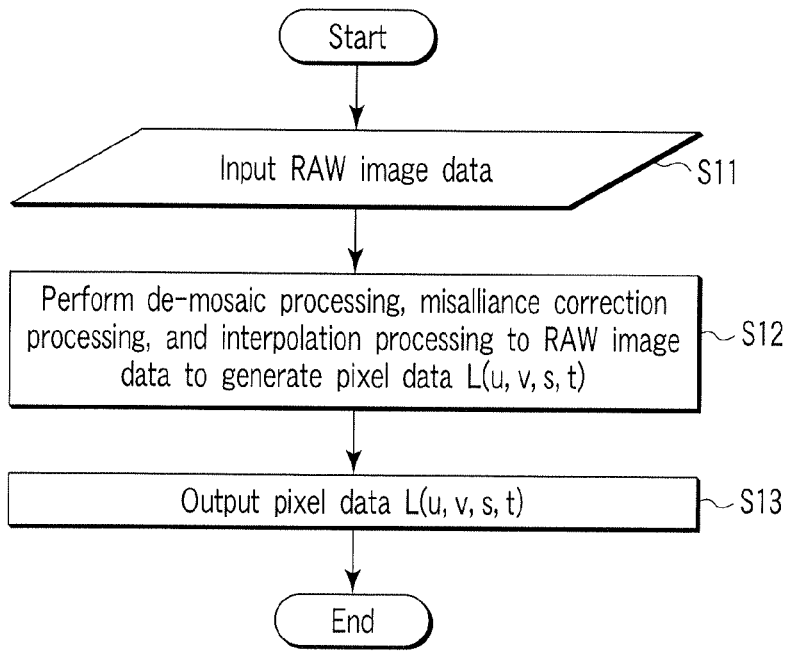
FIG. 6 is a flowchart for explaining processing of a pixel data generating unit shown in FIG. 5.

The pixel data generating unit 50 will be described first. FIG. 6 is a flowchart for explaining processing of the pixel data generating unit 50.

Step S11:

The pixel data generating unit 50 reads the RAW image data from the working memory 31.

Step S12:

The pixel data generating unit 50 performs de-mosaic processing, misalliance correction processing, and interpolation processing to the read RAW image data. In the de-mosaic processing, during the shooting, pieces of inadequate color information are collected from pixels around each pixel, and color information is complemented to produce a full-color image. For example, in the single-plate type color image sensor frequently used in the digital camera, the de-mosaic processing is required because each pixel has only the single-color color information. In the case of the three-plate type color image sensor, the de-mosaic processing is not required. In the misalliance correction processing, the image indicated by the RAW image data is rotated to correct misalliance in a crosswise direction between an array of the microlens ML(s, t) of the microlens array 25 shown in FIG. 4 and an array of the microlens block MLB of the imaging unit 27. In the interpolation processing, the predetermined number of pieces of pixel data is included in each microlens block MLB.

Step S13:

The pixel data generating unit 50 writes the pixel data L(u,v,s,t) of one frame generated in Step S12 in the working memory 31 in the form of the image data TE to be coded. The pixel data L(u,v,s,t) is an example of the light ray information.

The pixel-skipping processing unit 51, the JPEG coding unit 53, the plenoptic coding unit 55, and the header addition unit 61, which are used to encode the image data TE to be coded, will be described below.

Figure 7:
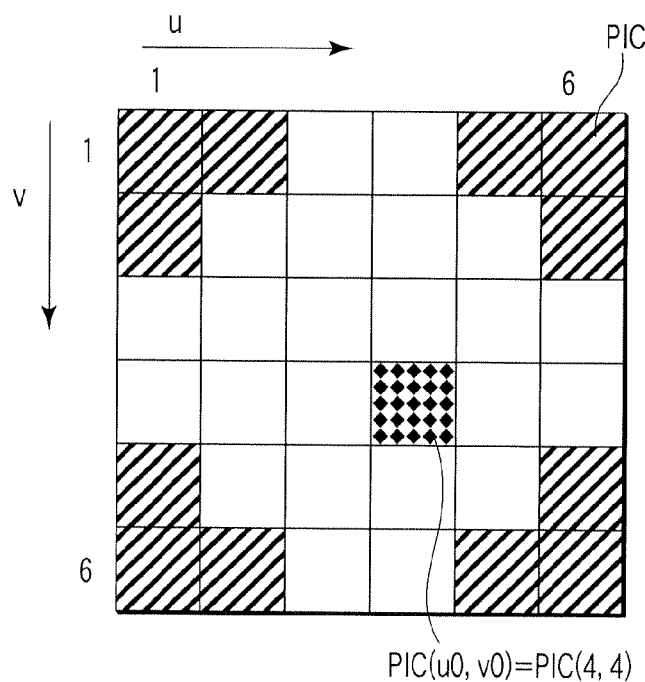
FIG. 7 shows the microlens block of the first embodiment.
Figure 8:
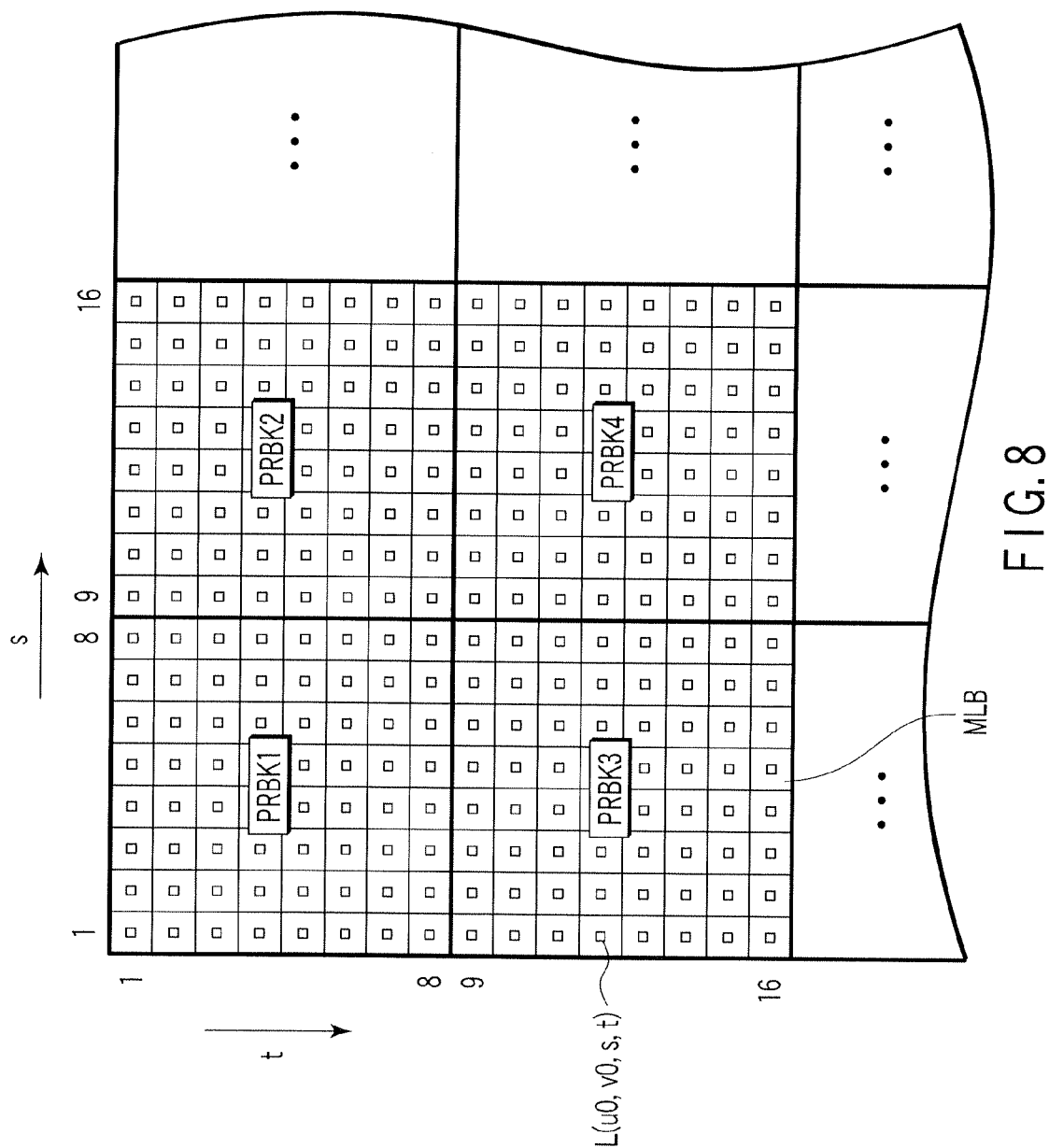
FIG. 8 shows a processing block of the first embodiment.

The pixel-skipping processing unit 51 generates image data TE2 by performing pixel-skipping of the pixel data L(u,v,s,t) of the pixel PIC(u,v) except for the pixel PIC(u0,v0), which is the pixel PIC(4,4) of each microlens block MLB as shown in FIG. 7 in the pixel data L(u,v,s,t) constituting the image data TE2 to be coded. As shown in FIG. 8, the image data TE2 becomes data including the pixel data L(u0,v0,s,t) by the pixel-skipping.

The JPEG coding unit 53 generates a JPEG Huffman code JF by performing JPEG coding processing to the image data TE2 generated by the pixel-skipping processing unit 51. The JPEG Huffman code JF is an example of the first image information and the coding processing performed by the JPEG coding unit 53 is an example of the first coding processing. In the first embodiment, the JPEG coding processing is described as an example of the first coding processing. Alternatively, another spatial frequency conversion may be used as the first coding processing.

The JPEG coding unit 53 performs DCT conversion processing to the image data TE2 to generate a DCT conversion factor K. The JPEG coding unit 53 quantizes the DCT conversion factor K. Then, the JPEG coding unit 53 performs zigzag scan to the quantized DCT conversion factor K from a low-frequency component (direct current) to a high-frequency component. Then, the JPEG coding unit 53 performs entropy coding such as Huffman coding to the scanned DCT conversion factor K to generate a JPEG Huffman code JF.

As shown in FIG. 5, the plenoptic coding unit 55 includes a path scan unit 57 and an LZW processing unit 59.

As described above, the JPEG coding unit 53 codes the image data TE2 including the pixel data L(u0,v0,s,t). On the other hand, the plenoptic coding unit 55 generates word row data WORD by reversibly coding the pixel data L(u,v,s,t) except for the pixel data L(u0,v0,s,t) in the image data TE to be coded.

Figure 9A:
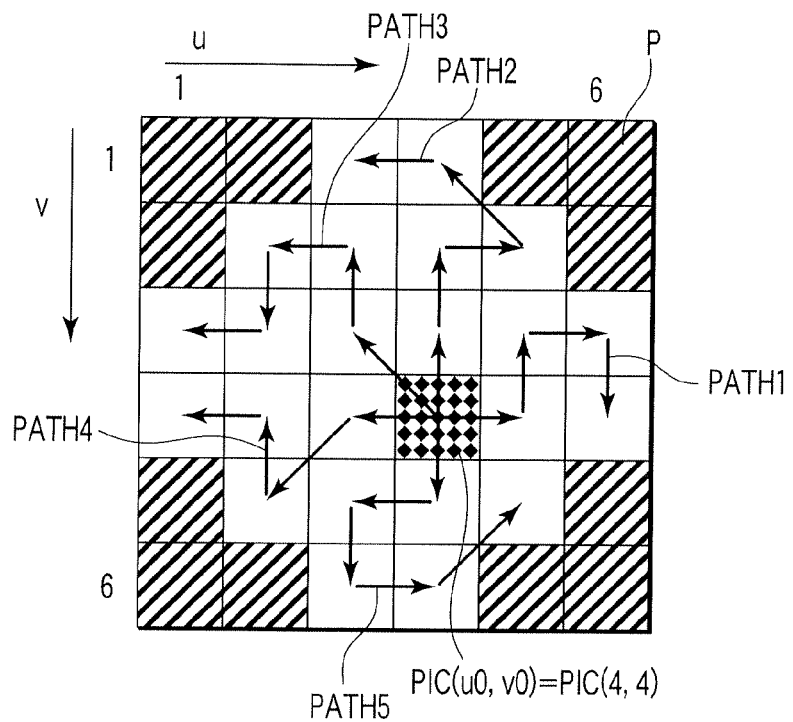
FIGS. 9A and 9B show a coding method of the microlens block of the first embodiment.

As shown in FIG. 9A, the path scan unit 57 performs the scan to the pixel data L(u,v,s,t) of the pixel PIC(u,v) except for the pixel PIC(u0,v0) with five paths PATH1, PATH2, PATH3, PATH4, and PATH5 while the pixel PIC(u0,v0) in each microlens block MLB is set to a base point.

In the scan of the path PATH1, the path scan unit 57 generates differential data D(5,4,s,t) between the pixel data L(5,4,s,t) and the pixel data L(u0,v0,s,t), differential data D(5,3,s,t) between the pixel data L(5,3,s,t) and the pixel data L(5,4,s,t), differential data D(6,3,s,t) between the pixel data L(6,3,s,t) and the pixel data L(5,3,s,t), and differential data D(6,4,s,t) between the pixel data L(6,4,s,t) and the pixel data L(6,3,s,t). The scan unit 57 generates a word WORD1 including the pieces of differential data D(5,4,s,t), D(5,3,s,t), D(6,3,s,t), and D(6,4,s,t).

In the scan of the path PATH2, the multi-path scan unit 57 generates differential data D(4,3,s,t) between the pixel data L(4,3,s,t) and the pixel data L(u0,v0,s,t), differential data D(4,2,s,t) between the pixel data L(4,2,s,t) and the pixel data L(4,3,s,t), differential data D(5,2,s,t) between the pixel data L(5,2,s,t) and the pixel data L(4,2,s,t), differential data D(4,1,s,t) between the pixel data L(4,1,s,t) and the pixel data L(5,2,s,t), and differential data D(3,1,s,t) between the pixel data L(3,1,s,t) and the pixel data L(4,1,s,t). The path scan unit 57 generates a word WORD2 including the pieces of differential data D(4,3,s,t), D(4,2,s,t), D(5,2,s,t), D(4,1,s,t), and D(3,1,s,t).

In the scan of the path PATH3, the path scan unit 57 generates differential data D(3,3,s,t) between the pixel data L(3,3,s,t) and the pixel data L(u0,v0,s,t), differential data D(3,2,s,t) between the pixel data L(3,2,s,t) and the pixel data L(3,3,s,t), differential data D(2,2,s,t) between the pixel data L(2,2,s,t) and the pixel data L(3,2,s,t), differential data D(2,3,s,t) between the pixel data L(2,3,s,t) and the pixel data L(2,2,s,t), and differential data D(1,3,s,t) between the pixel data L(1,3,s,t) and the pixel data L(2,3,s,t). The path scan unit 57 generates a word WORD3 including the pieces of differential data D(3,3,s,t), D(3,2,s,t), D(2,2,s,t), D(2,3,s,t), and D(1,3,s,t).

In the scan of the path PATH4, the multi-path scan unit 57 generates differential data D(3,4,s,t) between the pixel data L(3,4,s,t) and the pixel data L(u0,v0,s,t), differential data D(2,5,s,t) between the pixel data L(2,5,s,t) and the pixel data L(3,4,s,t), differential data D(2,4,s,t) between the pixel data L(2,4,s,t) and the pixel data L(2,5,s,t), and differential data D(1,4,s,t) between the pixel data L(1,4,s,t) and the pixel data L(2,4,s,t). The path scan unit 57 generates a word WORD4 including the pieces of differential data D(3,4,s,t), D(2,5,s,t), D(2,4,s,t), and D(1,4,s,t).

In the scan of the path PATH5, the path scan unit 57 generates differential data D(4,5,s,t) between the pixel data L(4,5,s,t) and the pixel data L(u0,v0,s,t), differential data D(3,5,s,t) between the pixel data L(3,5,s,t) and the pixel data L(4,5,s,t), differential data D(3,6,s,t) between the pixel data L(3,6,s,t) and the pixel data L(3,5,s,t), differential data D(4,6,s,t) between the pixel data L(4,6,s,t) and the pixel data L(3,6,s,t), and differential data D(5,5,s,t) between the pixel data L(5,5,s,t) and the pixel data L(4,6,s,t). The path scan unit 57 generates a word WORD5 including the pieces of differential data D(4,5,s,t), D(3,5,s,t), D(3,6,s,t), D(4,6,s,t), and D(5,5,s,t).

Figure 9B:
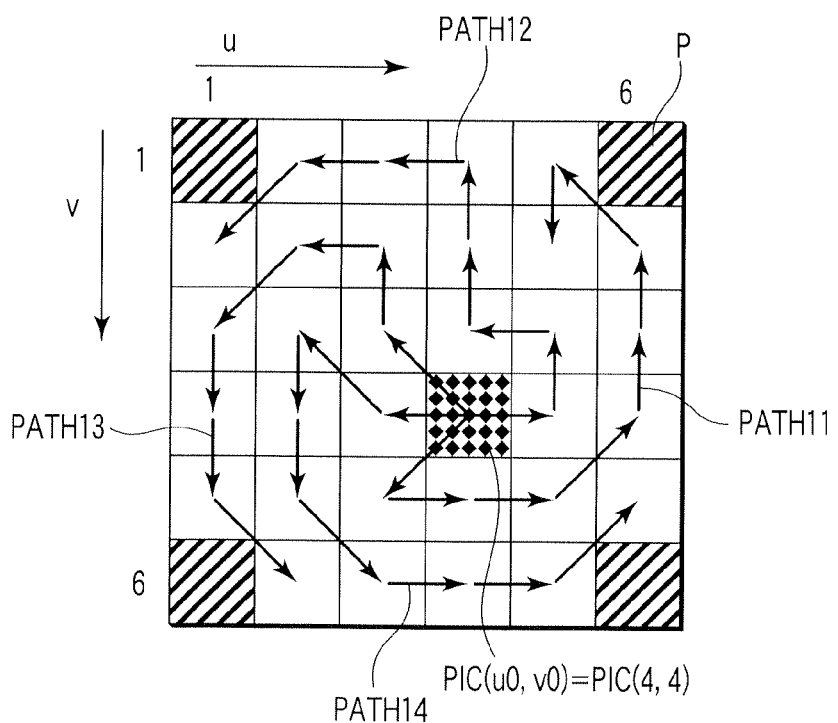

As shown in FIG. 7, the pieces of pixel data L(1,1,s,t), L(1,2,s,t), L(2,1,s,t), L(5,1,s,t), L(6,1,s,t), L(6,2,s,t), L(1,5,s,t), L(1,6,s,t), L(2,6,s,t), L(5,6,s,t), L(6,5,s,t), and L(6,6,s,t) of the pixels PIC(u,v) at four corners in each microlens block MLB are not scanned because pieces of effective pixel data are not obtained for a reason of a positional relationship between the microlens block MLB and the microlens ML. The reason why the pieces of effective pixel data are not obtained in the pixels at four corners in each microlens block MLB is that the optical system 23 including the focus lens 23a has a circular shape and the image projected onto the microlens block MLB through the focus lens 23a becomes the blurred circular shape. In the case where the focus lens 23a and the zoom lens 23b have rectangular shapes, the pieces of pixel data of the pixels except for only one pixel located at each corner in the microlens ML become effective as shown in FIG. 9B. In this case, the path scan unit 57 may perform the scan through paths PATH11 to PATH14 shown in FIG. 9B.

The path scan unit 57 generates word row data WORD by performing the scan processing to the pixel data $L(u,v,s,t)$ in processing block data PRBK shown in FIG. 8 which is a unit in the image data TE to be coded. The processing block data PRBK is an example of the processing unit block. The microlens block MLB is an example of the two-dimensional block data.

At this point, the processing block data PRBK includes the pieces of pixel data $L(u,v,s,t)$ of the 8-by-8 microlens block MLB, i.e., the total of 64 microlens blocks MLB. Therefore, the path scan unit 57 generates the word row data WORD having the $320(=5\times8\times8)$ words for the processing block data PRBK.

As shown in FIG. 10, the path scan unit 57 generates the word row data WORD by sequentially arranging the words WORD1 to WORD5 in a zigzag manner. The words WORD1 to WORD5 are generated for each of the $64(8\times8)$ microlens blocks MLB in the processing block data PRBK.

The LZW processing unit 59 generates an LZW compressed code LZ by performing LZW compression processing to the word row data WORD input from the path scan unit 57. The LZW processing unit 59 may perform universal coding (LZ coding) based on other dictionaries than LZW. The LZW compressed code LZ is an example of the second image information, and the coding processing performed by the plenoptic coding unit 55 is an example of the second coding processing.

The header addition unit 61 generates header data HEADER of the JPEG Huffman code JF generated by the JPEG coding unit 53 and the LZW compressed code LZ generated by the LZW processing unit 59. A pointer to the LZW compressed code, thumbnail image data, a file size, an image size, shooting date, and other pieces of tag information are written in the header data HEADER. The processing unit 32 writes the header data HEADER generated by the header addition unit 61, the pointer LZP to the LZW compressed code LZ, JPEG thumbnail data THM, and the JPEG Huffman code JF in the internal memory 35 or the detachable memory 39 in a file format having a data structure shown in FIG. 11.

The header interpretation unit 63 interprets the header data HEADER of the JPEG Huffman code JF and LZW compressed code LZ read from the working memory 31. The header interpretation unit 63 reads the pointer LZP to the LZW compressed code LZ, and reads the LZW compressed code LZ from an address in the internal memory 35 or detachable memory 39 indicated by the pointer LZP. Then, the header interpretation unit 63 outputs the read LZW compressed code LZ to the plenoptic decoding unit 67. The header interpretation unit 63 reads the JPEG Huffman code JF corresponding to the LZW compressed code LZ from the internal memory 35 or detachable memory 39. Then, the header interpretation unit 63 outputs the read JPEG Huffman code JF to the JPEG decoding unit 65.

The JPEG decoding unit 65 generates JPEG-decoded image data by performing JPEG decoding of the JPEG Huffman code JF output from the header interpretation unit 63. The JPEG-decoded image data includes the pixel data $L(u0,v0,s,t)$. The decoding processing performed by the JPEG decoding unit 65 corresponds to the coding processing of the JPEG coding unit 53. That is, the JPEG decoding unit 65 sequentially performs Huffman decoding processing, inverse quantization, and inverse DCT processing to the JPEG Huffman code JF. The plenoptic decoding unit 67 generates the pixel data $L(u,v,s,t)$ except for the pixel data $L(u0,v0,s,t)$ by decoding the LZW compressed code LZ based on the JPEG-decoded image data. The decoding processing performed by the plenoptic decoding unit 67 corresponds to the coding processing of the plenoptic coding unit 55.

The reproduction image generating unit 68 of FIG. 5 will be described below.

The reproduction image generating unit 68 generates image (reproduction image) data corresponding to the specified focus value based on the pixel data $L(u,v,s,t)$ which is decoded by the plenoptic decoding unit 67 and stored in the working memory 31. The focus value of the image data generated by the reproduction image generating unit 68 is determined based on a manipulation signal of the focus value forward button 820 or focus value backward button 821 of FIG. 1B. In displaying an reproduction image on the display unit 43, when the upward arrow button 832, the downward arrow button 833, the rightward arrow button 834, or the leftward arrow button 835 is manipulated while the OK button 831 of the cross manipulation unit 830 of FIG. 1B is pressed, the reproduction image generating unit 68 generates the reproduction image data of the depiction angle according to the manipulation. The processing performed by the reproduction image generating unit 68 will be described in detail later.

An operation example of the digital camera 1 will be described below.

[Image Data Recording Processing]

Figure 12:
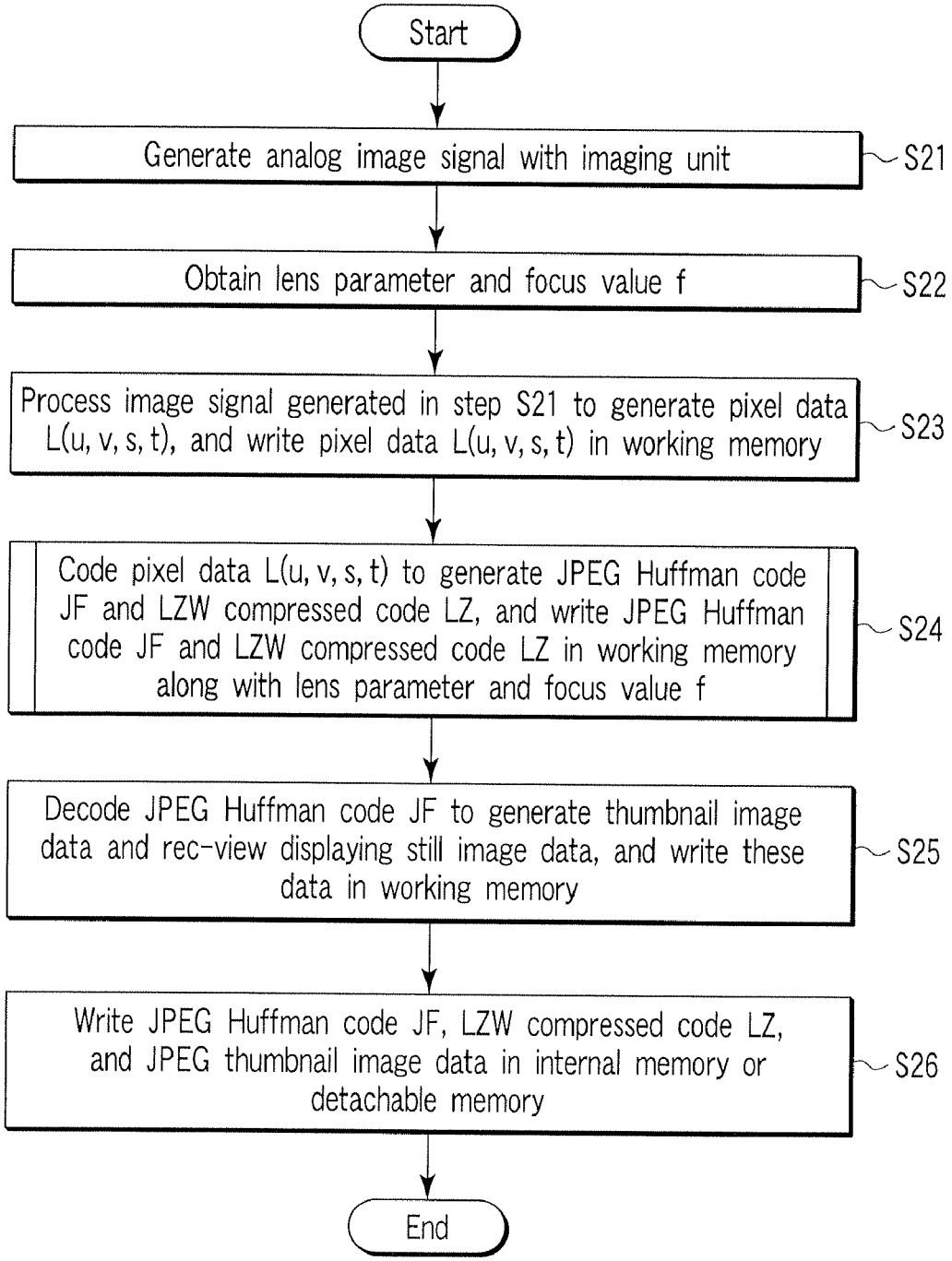
FIG. 12 is a flowchart for explaining an operation in which image data is coded and written in a working memory according to image formation result of the imaging unit shown in FIG. 2.

FIG. 12 is a flowchart for explaining an operation in which the image data is coded and written in the working memory 31 according to the image formation result of the imaging unit 27.

Steps of FIG. 12 will be described below. A sequence of parts of the following pieces of processing may be arbitrarily performed. Additionally, parts of the following pieces of processing may concurrently be performed.

Step S21:

When the release switch 6 of the manipulation unit 22 is turned on, each pixel of the imaging unit 27 receives the light from the subject, the imaging unit 27 performs the photoelectric conversion of the light received by the pixel, and generates the analog RAW image signal according to the charge generated by the photoelectric conversion.

Figure 26A:
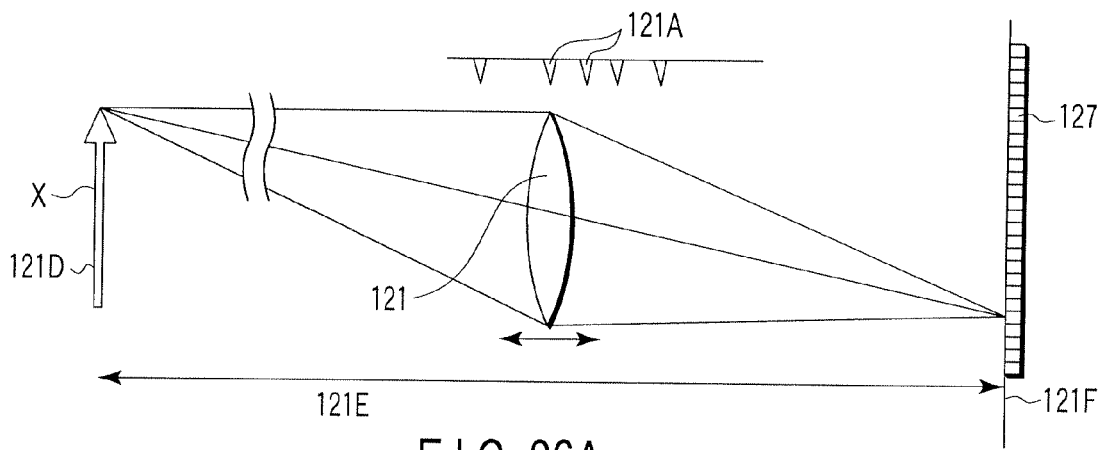
FIG. 26A shows an imaging principle of a conventional camera.
Figure 26B:
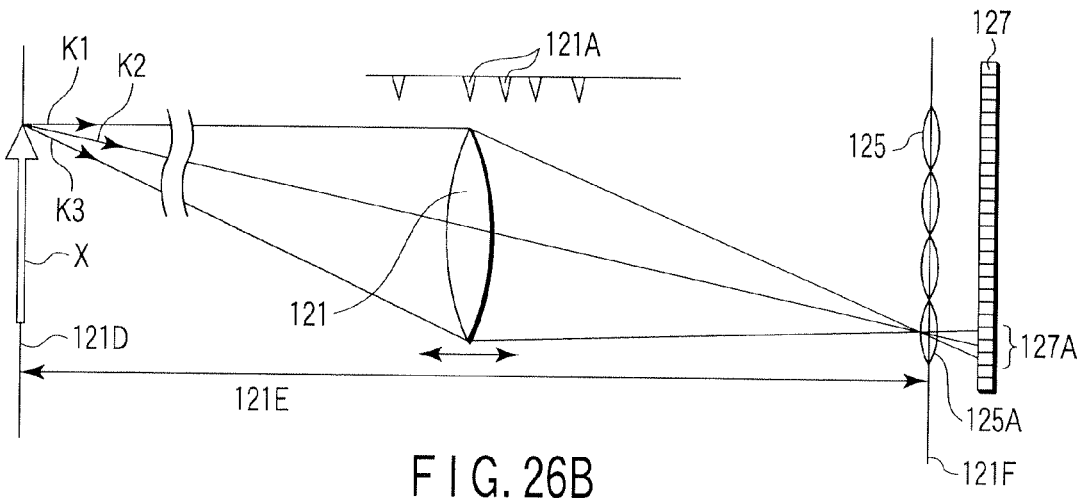
FIG. 26B shows an imaging principle of a conventional plenoptic camera.

Step S22:

The processing unit 32 obtains lens parameters and a focus value f, which are used in the optical system 23 when the RAW image signal is generated in Step S21. The focus value f corresponds to the subject distance 121E of FIG. 26B one-on-one. Accordingly, a value of the subject distance corresponding to the focus value f may be computed and obtained instead of the focus value f. In the following description, the subject distance computed in the above-described manner is also designated by the letter f. In the case of the single focus camera, it is not necessary to obtain the focus value f. However, a value f of a hyperfocal distance unique to the camera may be obtained as the focus value for the purpose of the reproduction processing.

Step S23:

The AFE 29 performs predetermined analog front end processing to the analog image signal input from the imaging unit 27. The AFE 29 performs the A/D conversion of the image signal obtained by the analog front end processing, and writes the digital RAW image data obtained by the A/D conversion in the working memory 31. The pixel data generating unit 50 reads the RAW image data from the working memory 31, and performs the de-mosaic processing, misalliance correction processing, and interpolation processing to generate the pixel data $L(u,v,s,t)$. Then, the pixel data generating unit 50 writes the image data TE to be coded in the working memory 31. The image data TE to be coded includes the pixel data $L(u,v,s,t)$.

Step S24:

The processing unit 32 reads the image data TE to be coded from the working memory 31, and codes the image data TE to generate the JPEG Huffman code JF and the LZW compressed code LZ. The processing unit 32 writes the JPEG Huffman code JF and the LZW compressed code LZ in the working memory 31 along with the lens parameters and focus value f obtained in Step S22. The coding processing and the like are performed by the pixel-skipping processing unit 51, JPEG coding unit 53, plenoptic coding unit 55, and header addition unit 61 of FIG. 5. Processing in Step S24 will be described in detail later with reference to FIG. 13.

Step S25:

The header interpretation unit 63 reads the JPEG Huffman code JF from the working memory 31. The header interpretation unit 63 interprets the header data HEADER, and the JPEG decoding unit 65 performs the decoding, thereby generating the pixel data L(u0,v0,s,t). Then, the processing unit 32 generates the thumbnail image data and REC-view displaying image data based on the decoded pixel data L(u0,v0,s,t). Then, thumbnail image data obtained by performing the JPEG coding of the thumbnail image data and the REC-view displaying image data are written in the working memory 31. The thumbnail image data is image data for displaying index image including plural thumbnail images on the display unit 43 when an index display instruction is received from a user. The REC-view displaying image data is used to confirm the image, and is image data for displaying the confirmation image on the display unit 43 for a predetermined time interval after the subject image is taken. When a thumbnail display instruction is received from the user, the processing unit 32 generates the thumbnail image data and writes the thumbnail image data in the video memory 41. This enables the thumbnail image to be displayed on the display unit 43.

Step S26:

The processing unit 32 reads the JPEG Huffman code JF, LZW compressed code LZ, and JPEG thumbnail image data from the working memory 31, and writes these codes and data in the internal memory 35 or detachable memory 39.

[Coding Processing (Step S24 in FIG. 12)]

Figure 13:
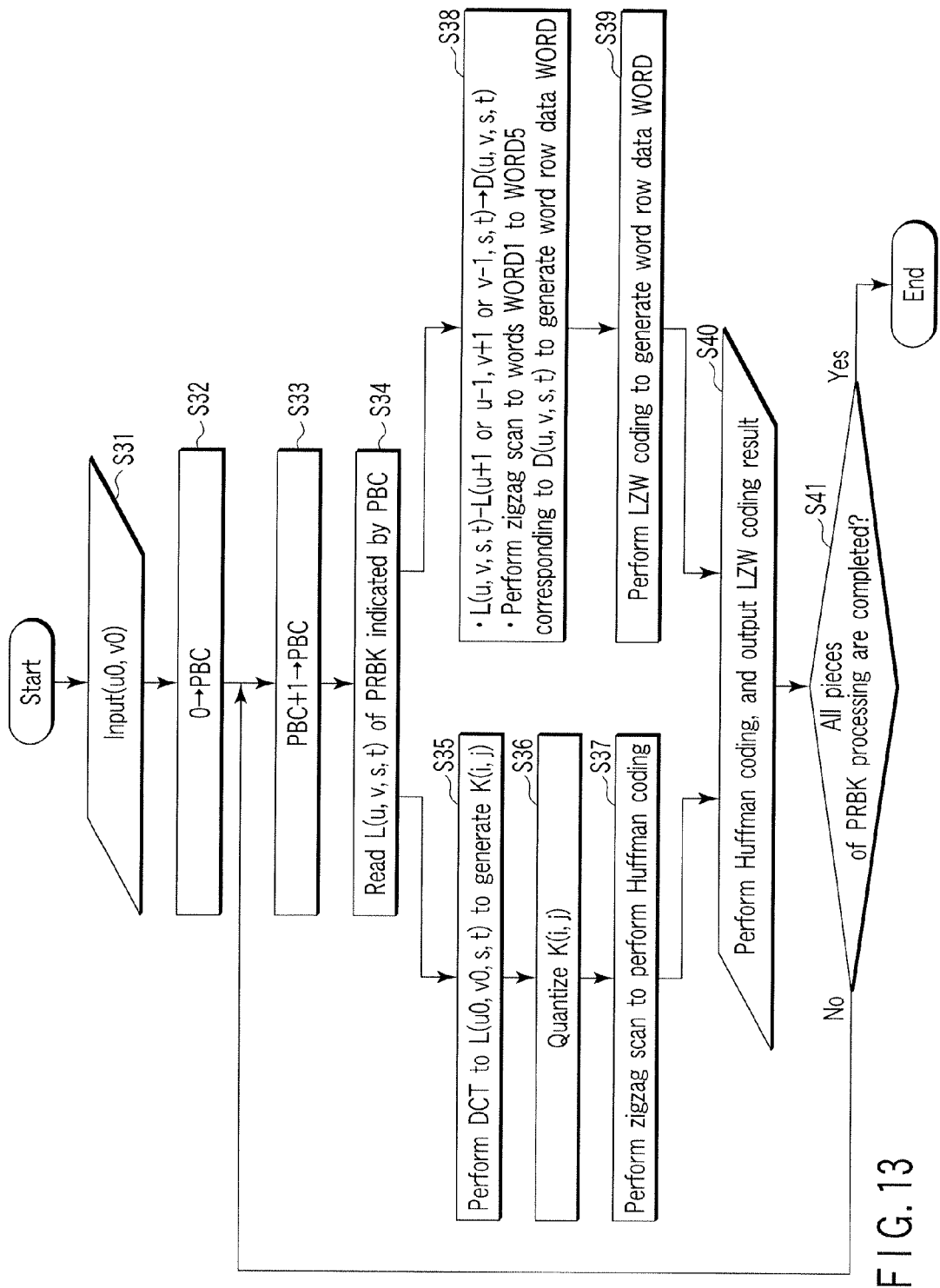
FIG. 13 is a flowchart for explaining processing of Step S24 shown in FIG. 12.

FIG. 13 is a flowchart for explaining the coding processing of Step S24 in FIG. 12 in detail. In the first embodiment, the processing (JPEG coding processing) of Steps S35 to S37 and the processing (LZW coding processing) of Steps S38 and S39 of FIG. 13 may concurrently be performed.

Step S31:

The information for specifying the pixel PIC(u0,v0) used to generate the JPEG Huffman code JF is input to the processing unit 32. The information for specifying the pixel PIC(u0,v0) is previously stored in a predetermined memory. In the first embodiment, u0 and v0 are equal to 4. This is because the pixel in the central portion of the microlens block ML has the most effective information.

Step S32:

The processing unit 32 substitutes an initial value of "0" for a variable PBC. The variable PBC indicates a value for specifying the processing block data PRBK of FIG. 8 used in performing the coding.

Step S33:

The processing unit 32 increments the value set in the variable PBC by "1".

Step S34:

The processing unit 32 reads the pixel data L(u,v,s,t) in the processing block data PRBK from the working memory 31. The pixel data L(u,v,s,t) in the processing block data PRBK is the coding target corresponding to the value indicated by the variable PBC.

Step S35:

On the basis of the information input in Step S31, the pixel-skipping processing unit 51 extracts the pixel data L(u0,v0,s,t) in the pixel data L(u,v,s,t) in the processing block data PRBK read in Step S34, and generates the image data TE2. The JPEG coding unit 53 performs the DCT conversion processing to the image data TE2 to generate a DCT conversion factor K(i,j).

Step S36:

The JPEG coding unit 53 quantizes the DCT conversion factor K(i,j) generated in Step S35.

Step S37:

The JPEG coding unit 53 performs the scan to the DCT conversion factor quantized in Step S36 in the zigzag manner from the low-frequency component (direct current) to the high-frequency component. Then, the JPEG coding unit 53 performs the entropy coding such as the Huffman coding to the scanned DCT conversion factor to generate a JPEG Huffman code JF1.

Step S38:

As shown in FIG. 9A, the path scan unit 57 of the plenoptic coding unit 55 performs the scan to the pixel data L(u,v,s,t), which is in the processing block data PRBK to be coded, of the pixel PIC(u,v) except for the pixel PIC(u0,v0) with five paths PATH1, PATH2, PATH3, PATH4, and PATH5 while the pixel PIC(u0,v0) in each microlens block MLB is set to the base point. As described above, the path scan unit 57 generates the differential data D(u,v,s,t) between the pixel data L(u,v,s,t) on the path and the previous pixel data L(u,v,s,t). The path scan unit 57 generates the word including the differential data D(u,v,s,t). The path scan unit 57 generates the word row data WORD by sequentially arranging the words WORD1 to WORD5 in the zigzag manner as shown in FIG. 10. The words WORD1 to WORD5 are generated for each of the 64(8×8) microlens blocks MLB in the processing block data PRBK.

Step S39:

The LZW processing unit 59 generates an LZW compressed code LZ1 by performing the LZW compression processing to the word row data WORD input from the path scan unit 57.

Step S40:

The header addition unit 61 generates the header data HEADER of the JPEG Huffman code JF1 generated by the JPEG coding unit 53 and the LZW compressed code LZ1 generated by the LZW processing unit 59, and writes the header data HEADER in the working memory 31.

Step S41:

The processing unit 32 determines whether or not the processing is performed to all the pieces of processing block data PRBK in the image data TE to be coded. When the processing unit 32 determines that the processing is performed to all the pieces of processing block data PRBK, the processing in Step S24 is ended. On the other hand, when the processing unit 32 determines that the processing is not performed to all the pieces of processing block data PRBK, the flow returns to Step S33.

Thus, the JPEG Huffman code JF(JF1, JF2, . . . ) and LZW compressed code LZ(LZ1, LZ2, . . . ), generated in each processing block data PRBK, are written in the JPEG Huffman code storage area and the LZW compressed code storage area of the data structure shown in FIG. 11.

[Reproduction Processing]

Figure 14:
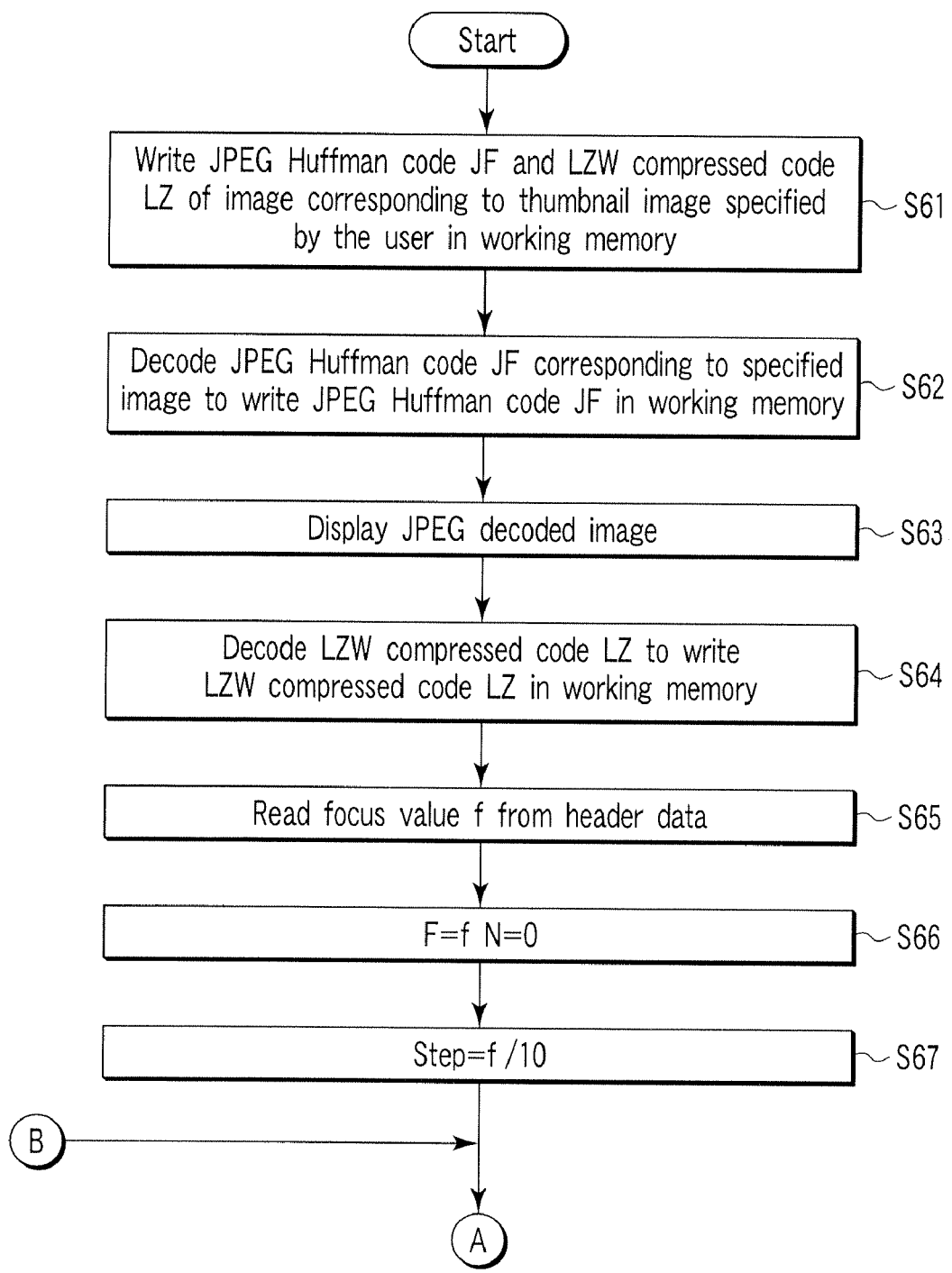
FIG. 14 is a flowchart for explaining reproduction processing in the first embodiment.
Figure 15:
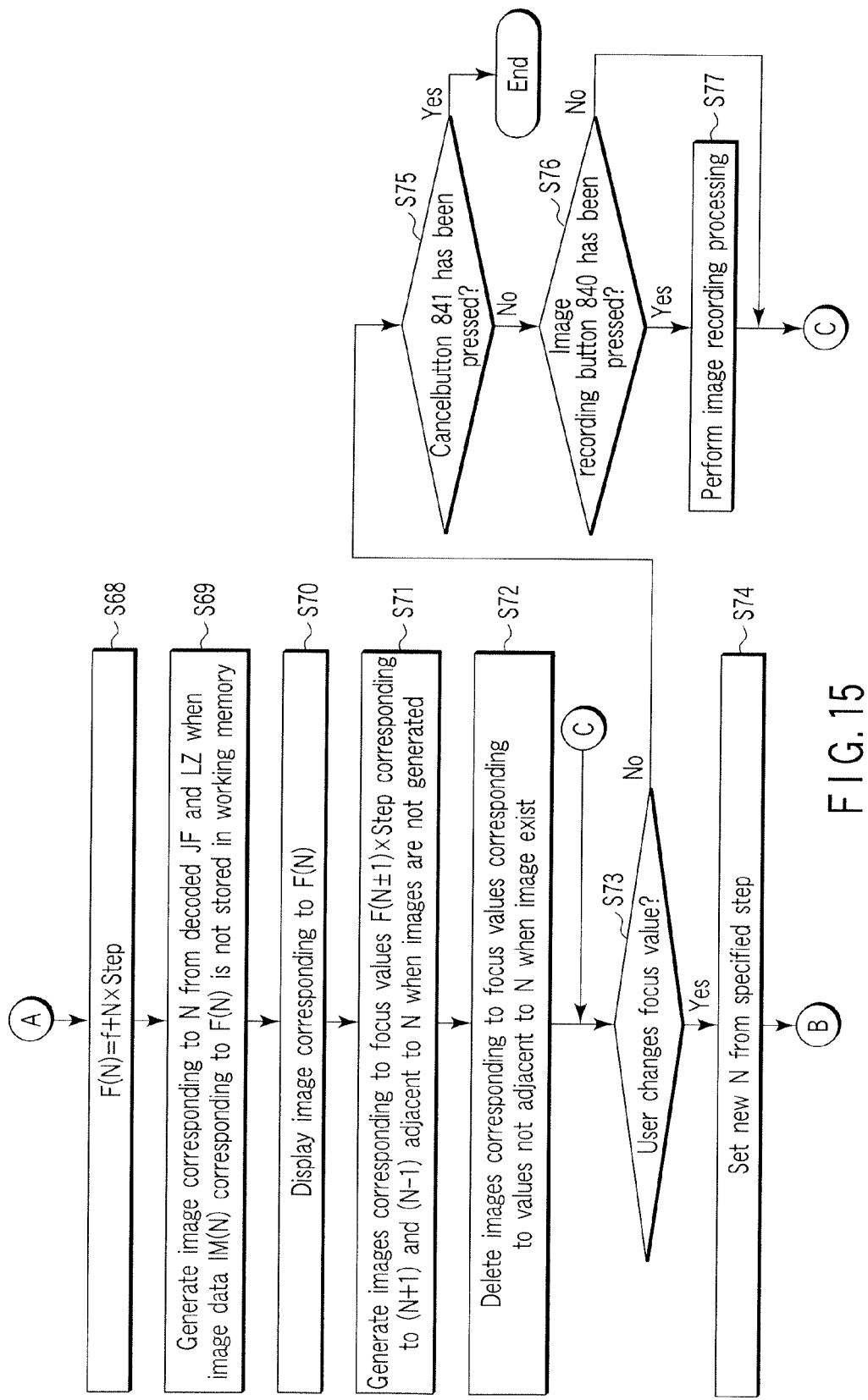
FIG. 15 is a flowchart for explaining the reproduction processing subsequent to the flowchart of FIG. 14.
Figure 16:
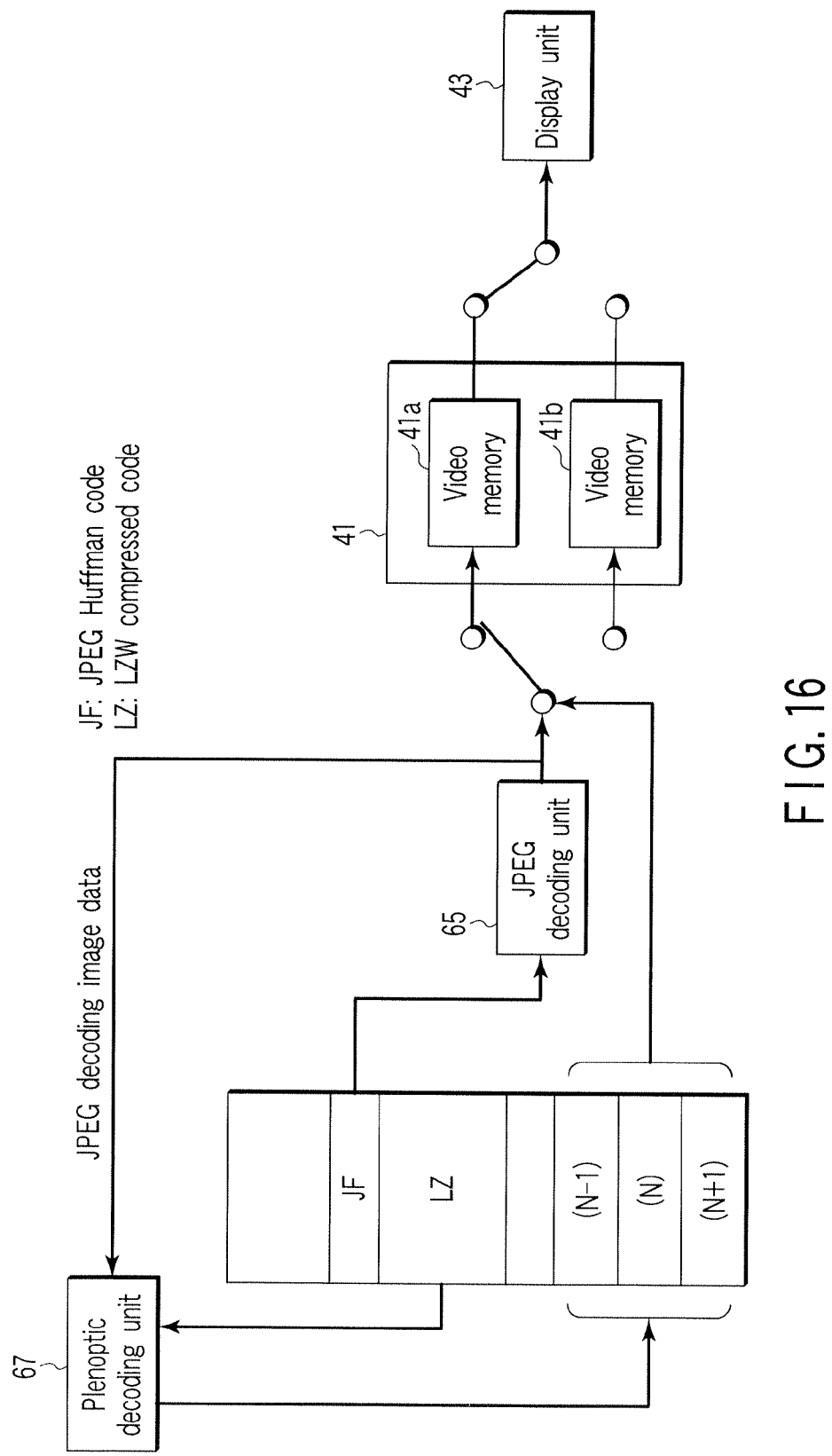
FIG. 16 shows a data flow in the reproduction processing shown in FIGS. 14 and 15.

FIGS. 14 and 15 are flowcharts for explaining reproduction processing. Each Step of the reproduction processing will be described with reference to FIGS. 14 to 16, and 17A to 17C.

Step S61:

The processing unit 32 reads the thumbnail image data (JPEG image data) from the internal memory 35 or detachable memory 39. Then, the processing unit 32 performs the JPEG decoding of the read thumbnail image data and writes the thumbnail image data in the video memory 41. This enables the thumbnail image to be displayed on the display unit 43. The JPEG-decoded thumbnail image data has the pixel data L(u0,v0,s,t), to which the pixel-skipping is already performed during the coding, as a factor. The thumbnail images corresponding to plural images taken are displayed during index display. When the user manipulates the manipulation unit 22 to specify one of the plural thumbnail images displayed on the display unit 43, the processing unit 32 reads the JPEG Huffman code JF and LZW compressed code LZ corresponding to the specified thumbnail image from the internal memory 35 or detachable memory 39 and writes the JPEG Huffman code JF and LZW compressed code LZ in the working memory 31.

Step S62:

The JPEG decoding unit 65 of the processing unit 32 reads the JPEG Huffman code JF corresponding to the thumbnail image specified in Step S61 from the working memory 31. Then, the JPEG decoding unit 65 performs the JPEG decoding of the read JPEG Huffman code JF to generate the JPEG-decoded image data. The JPEG-decoded image data includes the pixel data L(u0,v0,s,t) as the factor. Then, the processing unit 32 writes the JPEG-decoded image data in the working memory 31.

Step S63:

The processing unit 32 reads the JPEG-decoded image data written in the working memory 31 in Step S62, and writes the JPEG-decoded image data in the video memory 41. Therefore, the JPEG-decoded image including the pixel data L(u0, v0,s,t) as the factor is displayed on the display unit 43.

Step S64:

The plenoptic decoding unit 67 generates the pixel data L(u,v,s,t) except for the pixel data L(u0,v0,s,t) of the image corresponding to the specified thumbnail image based on the JPEG-decoded image data generated in Step S62 and the LZW compressed code LZ corresponding to the thumbnail image specified in Step S61. Then, the plenoptic decoding unit 67 writes the generated pixel data L(u,v,s,t) in the working memory 31.

Step S65:

The header interpretation unit 63 reads the focus value f corresponding to the JPEG Huffman code JF from the header data HEADER.

Step S66:

The reproduction image generating unit 68 substitutes the focus value f read in Step S65 for a variable F. The reproduction image generating unit 68 also substitutes "0" for a variable N indicating the number of steps from the focus value f.

Step S67:

The reproduction image generating unit 68 substitutes "f/10" for "Step" indicating a step width between adjacent focus values.

Step S68:

The reproduction image generating unit 68 substitutes the "Step" determined in Step S67 for F(N)=f+N×Step to calculate the focus value F corresponding to N.

Step S69:

The reproduction image generating unit 68 checks whether or not image data IM(N) of the focus value F(N) corresponding to N is stored in the working memory 31. When the image data IM(N) is not stored in the working memory 31, the reproduction image generating unit 68 generates the image data IM(N) (frame data) based on the pixel data L(u0,v0,s,t) decoded in Step S63 and the pixel data L(u,v,s,t) except for the pixel data L(u0,v0,s,t) decoded in Step S64. Then, the reproduction image generating unit 68 writes the image data IM(N) in the working memory 31. For example, the image data IM(N) is generated based on the technique disclosed in "Light Field Photography with a Hand-held Plenoptic Camera", Ren Ng et al, Stanford TechReport, 2005 and "Fourier Slice Photography", Ren Ng, Stanford University, 2005. That is, the image data IM(N) is generated based on the Fourier slicing method and the integration method. In the integration method, integration is performed on the effective pixel data in the microlens block MLB to obtain the image corresponding to the desired focus value. The integration method is based on expressions (1) to (6) in "Light Field Photography with a Hand-held Plenoptic Camera", Ren Ng et al, Stanford TechReport, 2005 and expressions (1) to (3) in "Fourier Space Photography", Ren Ng, Stanford University, 2005. The Fourier slicing method is a technique of effectively performing the integration processing in a short time on a Fourier space, and a four-dimensional Fourier space is used in the Fourier slicing method.

In any operation method, higher operation performance and longer operation time are required to obtain the image data IM(N) compared with the JPEG decoding processing. N is an integer, and the focus becomes a near side as N is decreased. Alternatively, the focus may become a far side as N is decreased.

Figure 17A:
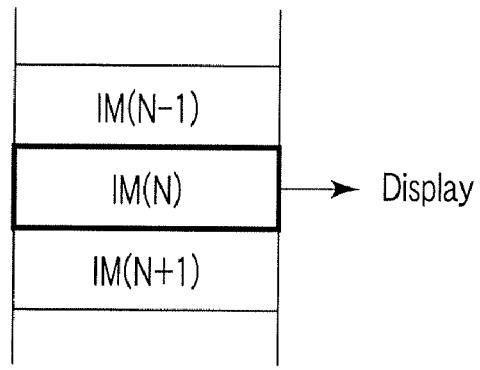
FIGS. 17A, 17B, and 17C show the reproduction processing of FIG. 14.

Step S70:

As shown in FIG. 17A, the reproduction image generating unit 68 writes the image data IM(N) in the video memory 41. Therefore, the image (reproduction image) corresponding to the focus value F(N) is displayed on the display unit 43. In an initial stage, as described above, the JPEG-decoded image including the pixel data (u0,v0,s,t) as the factor is already displayed on the display unit 43. The initial JPEG-decoded image is the image corresponding to the focus value of F(0). However, because the pixel skipping is already performed to the pixel data except for the pixel data (u0,v0) in each microlens block MLB, the initial JPEG-decoded image substantially becomes the image taken with a dark optical system. Accordingly, a noise is imposed on the initial JPEG-decoded image in the case where a dark scene is taken. In Step S70, the initial JPEG-decoded image is replaced by the image IM(0) corresponding to the focus value of F(0). In the image IM(0), all the pieces of effective pixel data are integrated in each microlens block MLB. Therefore, the image IM(0) becomes the clearer image having lesser noise.

As described in Step S69, because of the longer time necessary for the integration, the image corresponding to (u0,v0) is tentatively displayed for the user in Step S63. Thus, in the operation in which the image having the desired focus value or depiction angle is generated and displayed by decoding the light ray information, at first the image corresponding to the thumbnail image specified by the user can be displayed by generating and displaying only the JPEG-decoded image data corresponding to (u0,v0). Therefore, the user is not irritated.

Step S71:

In the case where pieces of image data IM(N+1) and IM(N−1) corresponding to (N±1) having focus values F(N±1)=f+(N±1)×Step adjacent to N are not generated, the reproduction image generating unit 68 generates the pieces of image data IM(N+1) and IM(N−1) and writes them in the working memory 31. The pieces of image data IM(N+1) and IM(N−1) are generated based on the Fourier slicing method and the integration method.

Step S72:

In the case where the pieces of image data corresponding to the focus values which are not adjacent to N exist, the reproduction image generating unit 68 deletes the pieces of image data corresponding to the focus values from the working memory 31.

Step S73:

The reproduction image generating unit 68 determines whether or not the user manipulates the focus value forward button 820 or focus value backward button 821 of FIG. 1B to specify the new focus value (to change the focus value). When the new focus value is specified, the reproduction image generating unit 68 performs processing in Step S74. When the focus value is not changed, the reproduction image generating unit 68 performs processing in Step S75.

Step S74:

The reproduction image generating unit 68 sets the new N corresponding to "Step" specified in Step S73, and the flow returns to Step S68. That is, N (count) is incremented by one when the focus value forward button 820 of FIG. 1B is pressed once, and N (count) is decremented by one when the focus value backward button 821 of FIG. 1B is pressed once, which updates the focus value F(N). The image data corresponding to the newly specified focus value is previously stored in the working memory 31. Accordingly, a time interval during which the image corresponding to the new focus value is displayed becomes short after the specification is made. Therefore, the digital camera 1 of the first embodiment has excellent response.

Figure 17B:
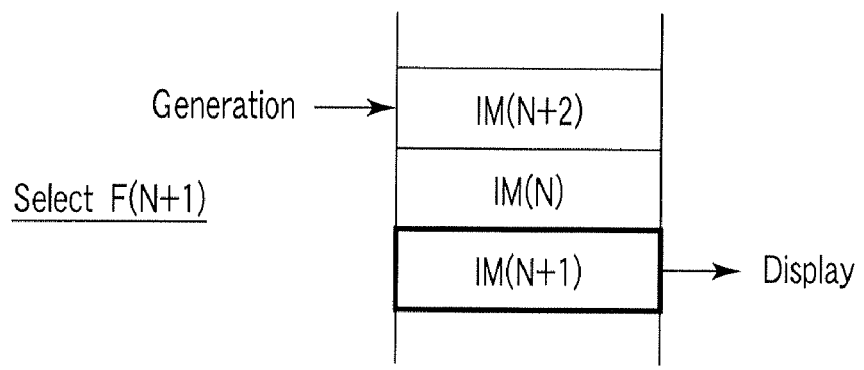
Figure 17C:
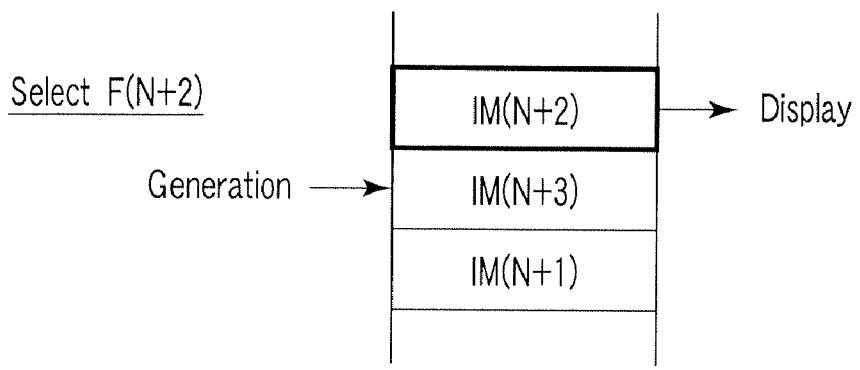

In the case where the image data IM(N+1) is read and displayed as shown in FIG. 17B, the reproduction image generating unit 68 generates the image data IM(N+2) corresponding to the focus value F(N+2) based on the pixel data L(u,v,s,t), and writes the image data IM(N+2) in the working memory 31. At this point, the image data IM(N−1) corresponding to the focus value F(N−1) is deleted by overwrite or the like. In the case where the image data IM(N+2) is read and displayed as shown in FIG. 17C, the reproduction image generating unit 68 generates the image data IM(N+3) corresponding to the focus value F(N+3) based on the pixel data L(u,v,s,t), and writes the image data IM(N+3) in the working memory 31. At this point, the image data IM(N) of the focus value F(N) is deleted by overwrite or the like.

In the case where the user quickly presses the focus value forward button 820 or focus value backward button 821 to provide an instruction for largely changing the focus value, the focus value is changed to a value in which the current variable N is jumped by plural "Steps". In this state of things, when the flow goes from Step S74 to Step S68, the image data does not exist in the working memory 31. In this case, the new image data is generated.

Step S75:

The processing unit 32 determines whether or not the user has pressed cancel button 841. When the user has pressed the cancel button 841, the reproduction of the image is stopped. When the user has not pressed the cancel button 841, the processing unit 32 performs processing in Step S76.

Step S76:

The processing unit 32 determines whether or not the user has pressed the image recording button 840. When the user has not pressed the image recording button 840, the processing unit 32 performs processing in Step S73. When the user has pressed the image recording button 840, the processing unit 32 performs processing in Step S77.

Step S77:

While the processing unit 32 performs the JPEG coding processing to the image data IM(N) in the working memory 31, the processing unit 32 writes the focus value F(N), initial focus value f, and depiction angle in the header data. Then, the processing unit 32 records the JPEG coding data in the internal memory 35 or detachable memory 39.

Thus, in the reproduction processing of the first embodiment, the image corresponding to the desired focus value f generated from the light ray information can be recorded after the user confirms the image. Accordingly, the user can surely obtain the image in which the desired subject is visually in focus without paying attention to the focus during the shooting.

[Focus Adjustment Processing and Zoom Adjustment Processing]

Figure 18:
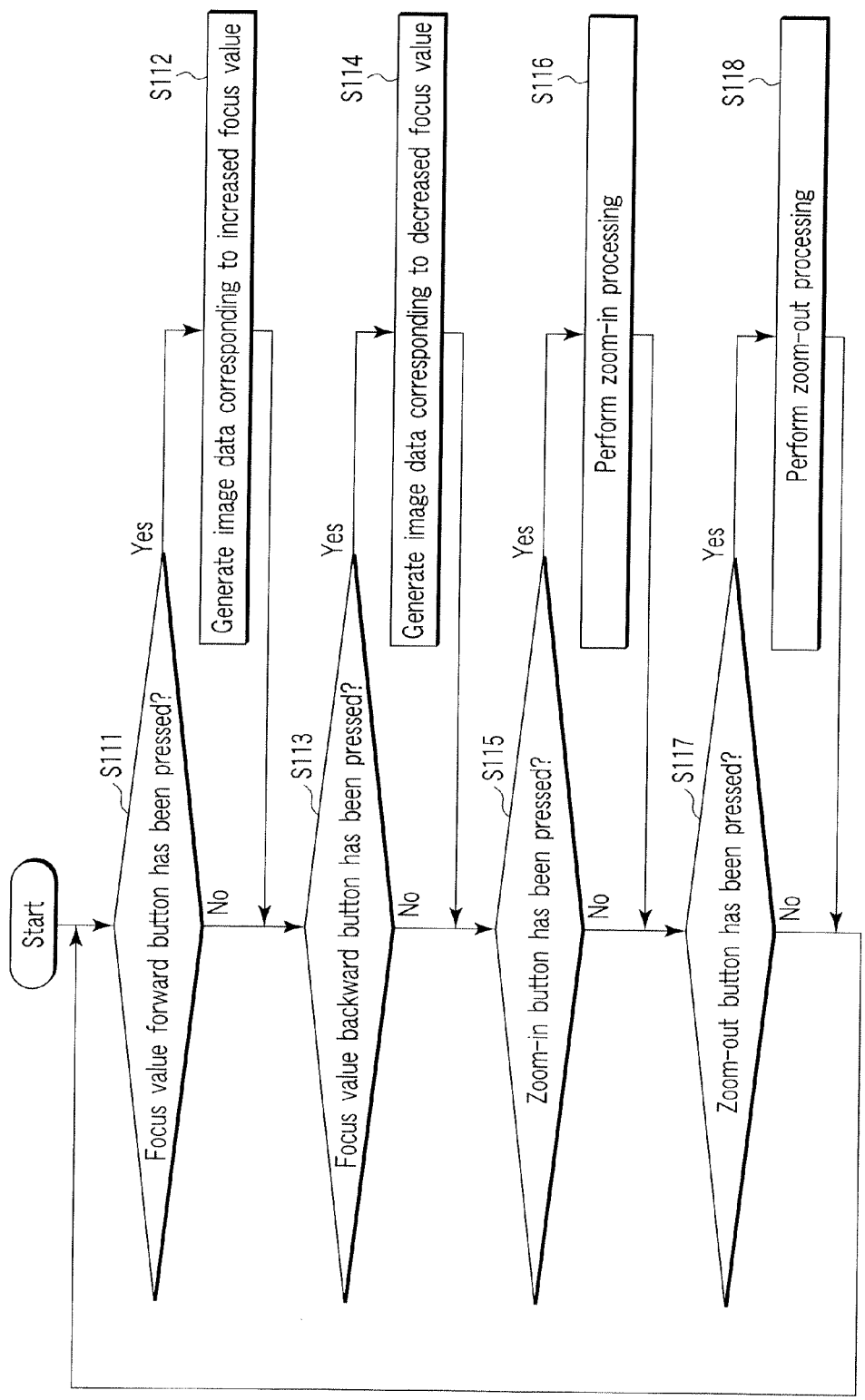
FIG. 18 is a flowchart for explaining focus adjustment processing and zoom adjustment processing during reproduction of the digital camera of the first embodiment.

FIG. 18 is a flowchart for explaining focus adjustment processing and zoom adjustment processing during the reproduction of the digital camera 1.

Step S111:

The reproduction image generating unit 68 determines whether or not the focus value forward button 820 of FIG. 1B has been pressed. When the focus value forward button 820 has been pressed, the reproduction image generating unit 68 performs processing in Step S112. When the focus value forward button 820 has not been pressed, the reproduction image generating unit 68 performs processing in Step S113.

Step S112:

The reproduction image generating unit 68 generates the new image (reproduction image) data corresponding to the increased focus value (specified focus value) based on the pixel data L(u,v,s,t) stored in the working memory 31, and writes the newly generated image data in the video memory 41. In the case where the image data corresponding to the specified focus value is already stored in the working memory 31 or the like, the reproduction image generating unit 68 reads the already-stored image data and write the image data in the video memory 41, and may generate the ungenerated image data corresponding to the focus value adjacent to the specified focus value. The same holds true for the following Steps S114, S116, and S118.

Step S113:

The reproduction image generating unit 68 determines whether or not the focus value backward button 821 has been pressed. When the focus value backward button 821 has been pressed, the reproduction image generating unit 68 performs processing in Step S114. On the other hand, when the focus value backward button 821 has not been pressed, the reproduction image generating unit 68 performs processing in Step S115.

Step S114:

The reproduction image generating unit 68 generates the image data corresponding to the decreased focus value based on the pixel data L(u,v,s,t) stored in the working memory 31, and writes the image data in the video memory 41.

Step S115:

The reproduction image generating unit 68 determines whether or not the zoom-in button 810 has been pressed. When the zoom-in button 81 has been pressed, the reproduction image generating unit 68 performs processing in Step S116. When the zoom-in button 810 has not been pressed, the reproduction image generating unit 68 performs processing in Step S117.

Step S116:

The reproduction image generating unit 68 generates the image data corresponding to the new zoom-in image of the image in reproduction, and writes the image data in the video memory 41. Therefore, as shown in FIG. 19, a zoom-in image 600 is displayed in a part of an entire image 602 displayed on the display unit 43.

Step S117:

The reproduction image generating unit 68 determines whether or not the zoom-out button 811 has been pressed. When the zoom-out button 811 has been pressed, the reproduction image generating unit 68 performs processing in Step S118. When the zoom-out button 811 has not been pressed, the reproduction image generating unit 68 performs the processing in Step S111.

Step S118:

The reproduction image generating unit 68 generates the image data corresponding to the new zoom-out image of the image in reproduction, and writes the image data in the video memory 41. Then, the flow returns to Step S111.

As shown in FIG. 20, the images in which a target object 610 is viewed horizontally and vertically from various depiction angles can be produced from the image information taken by the plenoptic camera. That is, as described in "Light Field Photography with a Hand-held Plenoptic Camera", all the light rays passing through the sub-apertures under the microlens array 25 are focused on the corresponding pixels, and sub-aperture images having different parallaxes can be produced from the light ray information by selecting the pixels under each microlens array 25.

[Processing According to Cross Manipulation Unit 830]

Figure 21:
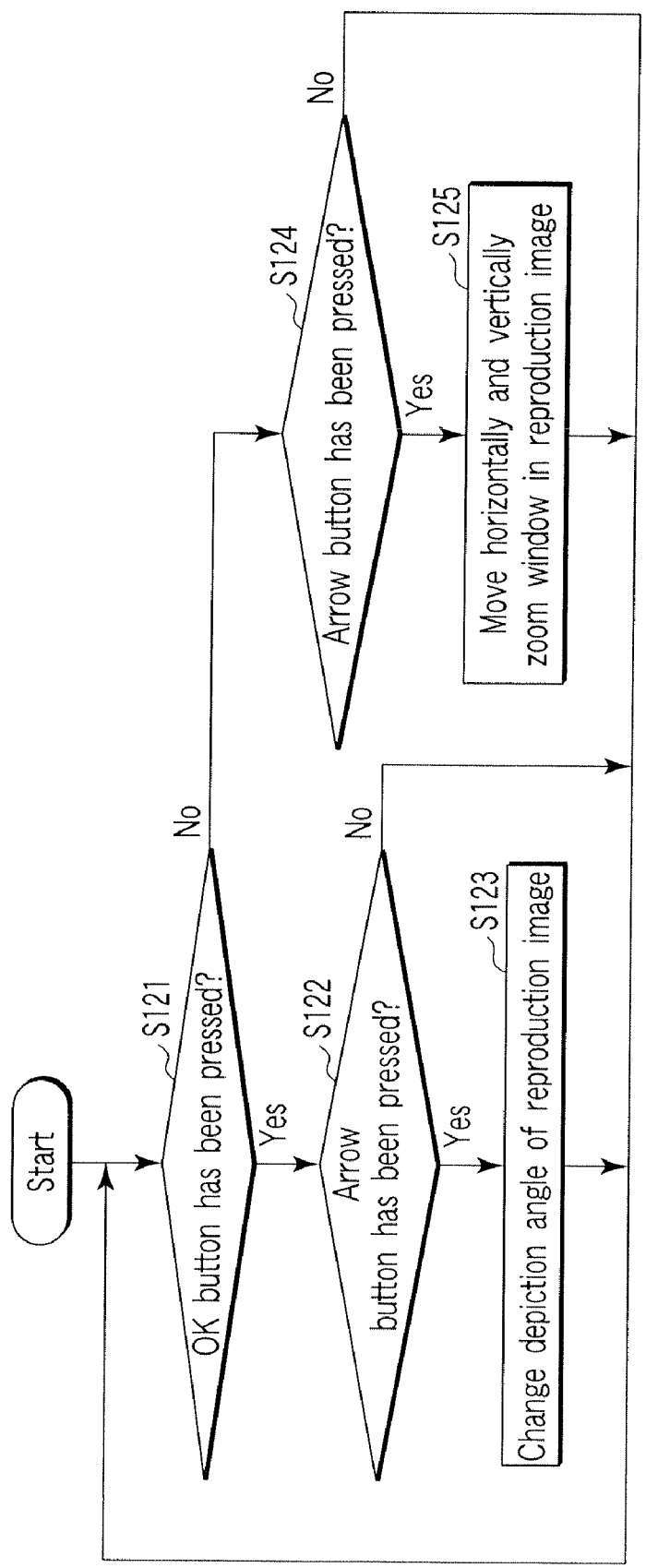
FIG. 21 is a flowchart for explaining processing in the case in which a cross manipulation unit of FIG. 1B is manipulated.

FIG. 21 is a flowchart for explaining processing in the case in which the cross manipulation unit 830 of FIG. 1B is manipulated.

Step S121:

The reproduction image generating unit 68 determines whether or not the OK button 831 of the cross manipulation unit 830 has been pressed. When the OK button 831 has been pressed, the reproduction image generating unit 68 performs processing in Step S122 (depiction angle changing mode). When the OK button has not been pressed, the reproduction image generating unit 68 performs processing in Step S124.

Step S122:

The reproduction image generating unit 68 determines whether or not one of the upward arrow button 832, downward arrow button 833, rightward arrow button 834, and leftward arrow button 835 has been pressed. When one of the arrow buttons has been pressed, the reproduction image generating unit 68 performs processing in Step S123. When any of the arrow buttons has not been pressed, the reproduction image generating unit 68 performs the processing in Step S121.

Step S123:

The reproduction image generating unit 68 generates the new image data in which the depiction angle of the reproduction image displayed on the display unit 43 is set to the angle direction specified by one of the upward arrow button 832, downward arrow button 833, rightward arrow button 834, and leftward arrow button 835. Then, the reproduction image generating unit 68 writes the new image data in the video memory 41 and displays the new image on the display unit 43.

Step S124:

The reproduction image generating unit 68 determines whether or not one of the upward arrow button 832, downward arrow button 833, rightward arrow button 834, and leftward arrow button 835 has been pressed. When one of the arrow buttons has been pressed, the reproduction image generating unit 68 performs processing in Step S125 (zoom window moving mode). When any of the arrow buttons has not been pressed, the reproduction image generating unit 68 performs the processing in Step S121.

Step S125:

The reproduction image generating unit 68 moves the zoom window in the reproduction image displayed on the display unit 43 toward the orientation specified by one of the upward arrow button 832, downward arrow button 833, rightward arrow button 834, and leftward arrow button 835.

Thus, in the digital camera 1 of the first embodiment, the reproduction image corresponding to the focus value adjacent to the specified focus value is previously generated and stored in the working memory 31 before the adjacent focus value is actually specified as shown in FIG. 14A. Therefore, in the case where the adjacent focus value is specified later, the reproduction image corresponding to the adjacent focus value is displayed in a short time on the display unit 43, so that the response can be improved when the focus value is specified to reproduce the image.

In the digital camera 1, as shown in FIG. 1B, the user can manipulate the focus value forward button 820 or focus value backward button 821 to discretely change the focus value corresponding to the reproduction image displayed on the display unit 43. Therefore, the user can see a reproduction image corresponding to any focus value in the discretely-defined plural focus values by the simple manipulation. That is, when the image is taken once, the various reproduction images in which any subject located in front and in the rear is visually in focus can be displayed by the simple manipulation during the reproduction.

In the digital camera 1, the two kinds of input modes can be selected in the cross manipulation unit 830 based on whether or not the OK button 831 has been pressed. Therefore, the adjustment operation of the depiction angle of the reproduction image displayed on the display unit 43 and the two-dimensional movement operation of the zoom window can be realized with few operation means.

In the digital camera 1, as described with reference to FIGS. 8 and 13, the image data TE to be coded including the four-dimensional light ray information is coded in a unit of processing block data PRBK. Therefore, the load associated with the coding processing of the processing unit 32 of FIG. 5 can be reduced to use a chip having relatively low processing performance, and a storage capacity required for the working memory 31 can also be decreased.

In the digital camera 1, as described with reference to FIG. 13, the JPEG coding is integrally performed to the pixel data L(u0,v0,s,t) in the microlens block MLB and other pieces of pixel data L(u0,v0,s,t) in the same processing block data PRBK. The LZW coding is integrally performed to the pixel data L(u,v,s,t) except for the pixel data L(u0,v0,s,t) in the microlens block MLB and the pixel data L(u,v,s,t) except for the pixel data L(u0,v0,s,t) in other microlens blocks MLB in the same processing block data PRBK. At this point, the 8-by-8 block processing in the JPEG processing and the LZW compression processing of the processing block data PRBK are concurrently performed. Therefore, in the digital camera 1, the amount of coding processing is decreased compared with the conventional case in which the spatial coding is performed to all the pieces of pixel data, so that the digital camera 1 can easily be adopted in the portable plenoptic camera. In each processing block data PRBK, the 8-by-8 block processing in the JPEG processing and the LZW compression processing of the processing block data PRBK are concurrently performed to enhance the coding processing rate. In the digital camera 1, the LZW coding (reversible coding) is performed to the pieces of pixel data L(u,v,s,t) except for the pixel data L(u0,v0,s,t) in the microlens block MLB. Therefore, the amount of information is not lost, and the light ray information in which the high quality image is maintained can be coded. That is, the information in the light ray propagation direction is reversibly coded, and the recording is performed without losing the information necessary to refocus in various focal points, which allows the image to be extremely clearly refocused. Accordingly, in the digital camera 1, the amount of coding processing is decreased compared with the conventional case in which the spatial coding is performed to all the pieces of pixel data, so that the digital camera 1 can easily be adopted in the portable plenoptic camera.

In the digital camera 1, the LZW coding (reversible coding) is performed to the pieces of pixel data L(u,v,s,t) except for the pixel data L(u0,v0,s,t) in the microlens block MLB. Therefore, the amount of information is not lost, and the light ray information in which the high quality image is maintained can be coded.

Second Embodiment

In a digital camera according to a second embodiment of the invention, an optical system 223 differs from the optical system 23 of the first embodiment. The optical system 223 will be described below.

FIG. 22 shows the optical system 223 of the digital camera according to the second embodiment of the invention. The optical system 223 includes a focus lens 223a and a zoom lens 223b. The optical system 223 collects the light from the subject and outputs the light toward the microlens array 25. In the focus lens 223a, a surface perpendicular to the optical axis is formed in a rectangular shape. The focus lens 223a projects the light from each point of the subject onto one convergent point on the microlens array 25. In the shooting mode, the zoom lens 223b is moved toward the zoom-in direction when the zoom-in button 810 is pressed, and is moved toward the zoom-out direction when the zoom-out button 811 is pressed.

In the zoom lens 223b, the two-dimensional shape of the surface perpendicular to the optical axis is formed in the rectangular shape as shown in FIG. 22.

In the second embodiment, the two-dimensional shape of the surface perpendicular to the optical axis of each microlens constituting the microlens array 25 is formed in the rectangular shape like the focus lens 223a and the zoom lens 223b.

In the imaging unit 27, the plural pixels are arrayed in the matrix shape as described in the first embodiment.

In the second embodiment, because the focus lens 223a, the zoom lens 223b, and each microlens 251 are formed in the same shape, i.e., the rectangular shape, almost all the pixels in the microlens block 271 corresponding to each microlens 251 can receive the light rays. FIG. 24 shows a state of a rectangular microlens block 271 of the second embodiment. As shown in FIG. 24, the microlens block 271 is formed by 8-by-8 pixels. In the microlens block of FIG. 24, the 28 peripheral pixels become ineffective, namely, the 28 peripheral pixels do not receive the light. On the other hand, the 36(6×6) pixels can receive the light, namely the 36 pixels are effective.

On the other hand, FIG. 23 shows light acceptance state in the case where a circular optical system is used. As shown in FIG. 23, the number of effective pixels of the microlens block 271 is decreased to 24 pixels. That is, many pixels become ineffective in the peripheral region. The region of the effective pixels is formed in the substantially circular shape to obtain the image of the circular optical system. When the positions of the optical system and microlens array 25 or imaging device 27 are changed along the optical axis to enlarge the effective pixel region, the circular image on which the optical system is mapped runs off to the region of the adjacent microlens block. Similarly, because the pixels around the microlens block 271 receive the light of the microlens adjacent to the microlens 251, the useful information is not obtained.

As is clear from the description, in the circular image on which the optical system is mapped, it is necessary that the surface perpendicular to the optical axis have the same shape as the microlens block in order to maximize the number of effective pixels in the microlens block. That is, it is necessary that the shape of the optical system (strictly, the shape of the focus lens 223a) be identical to the shape of each microlens 271. In the second embodiment, the shape of the microlens and the two-dimensional shape of the surface perpendicular to the optical axis of the optical system including the focus lens 223a and zoom lens 223b are formed in the rectangular shape to realize this condition.

When the condition is satisfied, the light reception sensitivity is improved because the number of effective pixels is increased in the microlens block. Because the pixel in the microlens block corresponds to the depiction angle, the more surrounding pixels become effective, and the depiction angle is widened, namely, the subject can be recognized more sterically.

Additionally, because of the increased data amount of light ray information L(u,v,s,t), visibility of the generated image is improved in any refocus processing (such as integration and Fourier slicing).

Thus, the plenoptic camera of the second embodiment can obtain the significant effect.

In the embodiments, the invention is applied to the digital camera 1. The invention may be applied to the decoding apparatus or display device having no imaging function.

In the embodiments, the image data corresponding to the focus value adjacent to the focus value corresponding to the image on the display is generated as described with reference to FIG. 14. Alternatively, image data of the focus value which is not adjacent to the focus value corresponding to the image on the display may previously be generated and stored.

In the embodiments, the image data corresponding to the focus value which is not adjacent to the focus value corresponding to the image on the display is deleted from the working memory 31. Alternatively, the image data corresponding to the focus value which is separated by two or more from the focus value corresponding to the image on the display may be deleted from the working memory 31.

In the embodiments, the number of pixels constituting the microlens block MLB and the number of microlens blocks MLB constituting the processing block data PRBK are shown only by way of example, and the number of pixels and the number of microlens blocks MLB can arbitrarily be determined.

In the camera of the embodiments, the focus can be adjusted by moving the focus lenses 23a and 223a. Alternatively, the electronic camera of the invention may be formed by the single-focus camera.

In the embodiments, the light ray from the subject is focused on the pixel of the imaging unit 27 through the microlens array 25. The invention is not limited to the embodiments, but there is no limitation as long as the light is incident to the pixel so as to include the light ray information. For example, the light ray from the subject may be reflected by a reflector and focused on the pixel of the imaging unit 27.

In the embodiments, the light ray information is coded and decoded using the processing unit 32 realized by DSP or the like. Alternatively, the functions of the processing unit 32 may be realized by executing a program using a microprocessor. In this case, Steps shown in the drawings are described in the program.

In the second embodiment, the focus lens 223a, the zoom lens 223b, each microlens, and the light reception surface of the pixel are formed in the rectangular shape by way of example. The focus lens 223a, the zoom lens 223b, each microlens, and the light reception surface of the pixel may be formed in any shape as long as they have the same shape.

The focus value f is a basis in the embodiments. Alternatively, as described above, the subject distance 21E corresponding to the focus value f may be used as a parameter g. In this case, a unit of the parameter g is meter (m). For example, in FIG. 14, "Step" width is set to "Step"=g/10, and the focus can be obtained every one meter when "Step" is set to one, namely, when the parameter g is set to 1 m.

Thus, when the subject distance is used in reproduction processing, the user can obtain the information how many meters the camera is focused, and the user more comfortably enjoys the refocus processing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A decoding method for decoding coded light ray information including positional information on a predetermined surface and angular information on the light ray incident to the surface, when a light ray from a subject is incident to the surface, the method comprising:
   decoding coded first image information and coded second image information different from the first image information, the first image information and the second image information being obtained in taking the subject and associated with the subject;
   generating the light ray information based on the decoded first image information and second image information;
   generating image information based on the generated light ray information, the image information corresponding to a first focus value in taking the subject;
   storing the image information corresponding to the first focus value in a storage medium;
   displaying an image based on the image information corresponding to the first focus value;
   generating image information based on the generated light ray information, the image information corresponding to a second focus value different from the first focus value; and
   storing the image information corresponding to the second focus value in the storage medium,
   wherein the image information corresponding to the second focus value is generated and stored, while the image is displayed or before the image is displayed.

2. The decoding method according to claim 1, further comprising:
   displaying an image based on the image information corresponding to the second focus value in response to an instruction of a user;
   generating image information based on the generated light ray information while the image is displayed based on the image information corresponding to the second focus value, the image information corresponding to a third focus value different from the first focus value and second focus value; and
   storing the image information corresponding to the third focus value in the storage medium,
   wherein the displaying of the image based on the image information corresponding to the second focus value and the storing of the image information corresponding to the third focus value are repeated based on the instruction of the user.

3. The decoding method according to claim 2, further comprising deleting image information corresponding to a focus value which is not adjacent to a focus value corresponding to image information on which the image on display is based when the image on display is generated, in the pieces of image information stored in the storage medium.

4. The decoding method according to claim 3, further comprising selecting image information from pieces of generated image information corresponding to the focus values, based on an instruction of a user;
   performing coding processing to the selected image information based on spatial frequency conversion; and
   recording the image information in a recording medium.

5. The decoding method according to claim 1, wherein each of the first focus value and the second focus value is one of a plurality of focus values previously defined in a discrete manner.

6. The decoding method according to claim 5, wherein the second focus value is a focus value adjacent to the first focus value on a near side or a far side.

7. The decoding method according to claim 5, further comprising specifying any focus value as the second focus value based on an instruction of a user.

8. The decoding method according to claim 7, further comprising deleting image information corresponding to a focus value which is not adjacent to a focus value corresponding to image information on which the image on display is based when the image on display is generated, in the pieces of image information stored in the storage medium.

9. The decoding method according to claim 8, further comprising selecting image information from pieces of generated image information corresponding to the focus values, based on an instruction of a user;
   performing coding processing to the selected image information based on spatial frequency conversion; and
   recording the image information in a recording medium.

10. The decoding method according to claim 1, wherein the second focus value is a focus value adjacent to the first focus value on a near side or a far side.

11. The decoding method according to claim 1, further comprising specifying any focus value as the second focus value based on an instruction of a user.

12. The decoding method according to claim 11, further comprising deleting image information corresponding to a focus value which is not adjacent to a focus value corresponding to image information on which the image on display is based when the image on display is generated, in the pieces of image information stored in the storage medium.

13. The decoding method according to claim 12, further comprising selecting image information from pieces of generated image information corresponding to the focus values, based on an instruction of a user;
   performing coding processing to the selected image information based on spatial frequency conversion; and
   recording the image information in a recording medium.

14. The decoding method according to claim 1, further comprising selecting image information from pieces of generated image information corresponding to the focus values, based on an instruction of a user;
   performing coding processing to the selected image information based on spatial frequency conversion; and
   recording the image information in a recording medium.

15. The decoding method according to claim 1, wherein the second image information is decoded based on the decoded first image information in generating the light ray information.

16. The decoding method according to claim 1, wherein decoding processing corresponding to spatial frequency conversion is performed to the coded first image information and decoding processing corresponding to LZ coding is performed to the coded second image information, in generating the light ray information.

17. The decoding method according to claim 1, further comprising decoding coded thumbnail image before the light ray information is generated, the thumbnail image being obtained in taking the subject and associated with the subject; and displaying the thumbnail image before the light ray information is generated, wherein generating the light ray information is performed by selecting the displayed thumbnail image in response to instruction.

18. A decoding apparatus which decodes coded light ray information including positional information on a predetermined surface and angular information on the light ray incident to the surface, when a light ray from a subject is incident to the surface, the apparatus comprising:

a decoding unit which decodes coded first image information and coded second image information to generate the light ray information, the second image information being different from the first image information, the first image information and the second image information being obtained in taking the subject and associated with the subject;

a first image generating unit which generates Image information based on the generated light ray information, the image information corresponding to a first focus value in taking the subject, the first image generating unit storing the image information in a storage medium;

a display unit which displays an image according to the image information generated by the first image generating unit; and a second image generating unit which generates image information based on the light ray information generated by the decoding unit, the image information corresponding to a second focus value different from the first focus value, the second image generating unit storing the image information in the storage medium.

19. A computer-readable recording medium having stored therein a program for decoding coded light ray information including positional information on a predetermined surface is incident to the surface and angular information on the light ray incident to the surface, when a light ray from a subject, wherein the program causes the computer to execute the functions of:

decoding coded first image information and coded second image information to generate the light ray information, the second image information being different from the first image information, the first image information and the second image information being obtained in taking the subject and associated with the subject;

generating image information based on the generated light ray information, the image information corresponding to a first focus value in taking the subject;

storing the image information corresponding to the first focus value in a storage medium;

displaying an image according to the stored image information;

generating image information based on the generated light ray information, the image information corresponding to a second focus value different from the first focus value; and storing the image information corresponding to the second focus value in the storage medium.

20. A decoding method for decoding image data according to coded light ray information including positional information on a predetermined surface and angular information on the light ray incident to the surface, when a light ray from a subject is incident to the surface, the method comprising:

decoding first image information to generate first pixel data corresponding to each of a plurality of pieces of two-dimensional block data, the first image information being obtained in taking the subject, the coded light ray information including the first image information, the image data including the pieces of two-dimensional block data;

decoding second image information to generate second pixel data for each of the plurality of pieces of two-dimensional block data based on the first pixel data of the two-dimensional block data, the coded light ray information including the second image information;

generating image data corresponding to a first focus value in taking a subject based on the first pixel data and the second pixel data;

storing the image data corresponding to the first focus value in a storage medium;

displaying the image data corresponding to the first focus value;

generating image data corresponding to a second focus value based on the first pixel data and the second pixel data, the second focus value being different from the first focus value; and storing the image data corresponding to the second focus value in the storage medium.

* * * * *